US006986825B1

(12) United States Patent
Squires et al.

(10) Patent No.: US 6,986,825 B1
(45) Date of Patent: Jan. 17, 2006

(54) METHODS OF THERMAL LAMINATION

(75) Inventors: Leslie James Squires, Blairgowrie (GB); Timothy Woodbridge, Hertfordshire (GB)

(73) Assignee: Hunt Technology Limited, London (GB)

( * ) Notice: Subject to any disclaimer, the term of this patent is extended or adjusted under 35 U.S.C. 154(b) by 0 days.

(21) Appl. No.: 09/762,617

(22) PCT Filed: Apr. 30, 1999

(86) PCT No.: PCT/GB99/01356

§ 371 (c)(1),
(2), (4) Date: Mar. 30, 2001

(87) PCT Pub. No.: WO00/09333

PCT Pub. Date: Feb. 24, 2000

(30) Foreign Application Priority Data

| | | |
|---|---|---|
| Aug. 10, 1998 | (GB) | 9817399 |
| Sep. 2, 1998 | (GB) | 9819131 |
| Feb. 19, 1999 | (GB) | 9903909 |
| Feb. 19, 1999 | (GB) | 9903913 |

(51) Int. Cl.
*B32B 31/08* (2006.01)
*B32B 31/20* (2006.01)

(52) U.S. Cl. ...................... 156/290; 156/291; 156/324; 156/209

(58) Field of Classification Search ........ 156/290–291, 156/324
See application file for complete search history.

(56) References Cited

U.S. PATENT DOCUMENTS

| | | | | |
|---|---|---|---|---|
| 4,217,386 | A | 8/1980 | Arons et al. | |
| 4,260,443 | A * | 4/1981 | Lindsay et al. | 156/220 |
| 4,725,473 | A | 2/1988 | Van Gompel et al. | |
| 4,761,322 | A | 8/1988 | Raley | |
| 4,803,032 | A * | 2/1989 | Schulz | 264/284 |
| 5,695,868 | A | 12/1997 | McCormack | |
| 5,763,041 | A | 6/1998 | Leak et al. | |
| 6,306,482 | B1 * | 10/2001 | Ruppel et al. | 156/209 |

FOREIGN PATENT DOCUMENTS

| | | |
|---|---|---|
| CH | 13063/71 | 8/1975 |
| DE | 19 54 801 | 11/1970 |

(Continued)

*Primary Examiner*—Sam Chuan Yao
(74) *Attorney, Agent, or Firm*—Dinsmore & Shohl LLP

(57) ABSTRACT

A method of and apparatus for laminating a first material (40) such as a spunbonded polymer having a point emboss pattern (41) formed thereon, to a second material (43) such as a polymer film, involves use of a lamination process using a point lamination pattern (56) provided on a heated calender roll (50). One or more geometric characteristics of two patterns (41, 56) such as bonding/contact area, pitch or angle of axes, is selected and differentiated, prior to lamination, to control, during lamination, the amount of point or mis-registration between the two patterns (41, 56). The laminate (60) can have optimum all over lamination if the amount of point mis-registration is maximized. An adhesive can be provided between the first and second materials (40, 43) to enable lamination of dissimilar composition materials.

36 Claims, 19 Drawing Sheets

FOREIGN PATENT DOCUMENTS

| | | | |
|---|---|---|---|
| DE | 195 34 812 A1 | | 3/1997 |
| DE | 196 47 458 A1 | | 5/1998 |
| EP | 0 490 476 A1 | | 6/1992 |
| EP | 0 604 736 A2 | | 7/1994 |
| GB | 1 459 106 | | 12/1976 |
| GB | 2 284 384 A | | 6/1995 |
| GB | 2 290 052 A | | 12/1995 |
| JP | 5209355 | | 8/1993 |
| WO | WO 9720687 A1 | * | 6/1997 |
| WO | WO 9720688 A1 | * | 6/1997 |

* cited by examiner

METHODS OF THERMAL LAMINATION

This application is a 371 of PCT/GB99/01356, filed on Apr. 30, 1999.

The present invention concerns improvements relating to methods of thermal lamination. More particularly, though not exclusively, the present invention relates to a method of and an apparatus for thermally laminating a first nonwoven spunbonded polymer fabric having a emboss pattern formed thereon, to a second polymer fabric, by a lamination process using a point lamination pattern which is provided on a thermobonding calender.

Nonwoven technology is a generic term encompassing a broad range of textile technologies in which fibres or filaments are bonded by means other than weaving or knitting. In nonwoven technology, methods commonly employed to achieve bonding between the fibres or filaments include entanglement of the fibres using high-pressure water jets, adhesive bonding or thermal bonding. Thermal bonding uses a combination of heat and pressure to bond thermoplastic fibres or filaments. This method of bonding is well known and is the most frequently used method in the type of nonwoven production known as spunbonding or spunlaying.

In spunbonded nonwoven production, continuous filaments of thermoplastic polymers, such as polypropylene, are extruded through thousands of spinnerets to form a loose web which is then bonded using heat and pressure to form a finished fabric in one continuous process. The process is only suitable for thermoplastic polymers such as polypropylene, polyamide or polyester, for example. A schematic diagram of a spunbonding production line is shown in FIG. 1.

Thermal bonding of thermoplastic filaments may be achieved by heat and pressure applied evenly across the whole area of the fabric or it may be applied intermittently so that only discrete areas of fabric are bonded. Discrete bonding, more commonly referred to as 'point bonding', confers a more textile character to the material compared to total area bonding. The textile character of point bonded fabrics is due to the ability of the filaments to move relatively freely in the areas between the emboss points since they are bonded or welded together only at the emboss points. Referring to FIG. 2, point bonding is most frequently achieved using a calender system comprising two heated rolls (calender rolls) 2, one smooth and one carrying a raised embossing pattern 4 on its surface, so that a loose web of fibres or filaments 6 are bonded together as they pass through the nip 8 between the two calender rolls 2. The calender system shown in FIG. 2 is used to bond a loose web of filaments thermally together to produce a spunbonded nonwoven fabric 10. The properties of the bonded material, its appearance, drape, softness and strength, are all influenced by the choice of the bonding pattern 4.

In an extension of this process, another layer, such as a film, fabric or microfibre layer, may be fed through the nip of the spunbonding calender system along with the loose web of thermoplastic filaments, and be simultaneously bonded to it. The additional layers are typically fed into the calender system at positions $A^1$ or $A^2$ indicated in FIG. 1. For thermal bonding to occur to any useful extent between the textile fibres or filaments and additional membranes, the materials should be compatible i.e. be related in chemical composition and melting points.

Thermal lamination of this type may be referred to as 'in-line' lamination since it is conducted directly in the spunbonding calender system whereby bonding of the thermoplastic filaments together and lamination of those thermoplastic filaments to any additional layers occurs simultaneously.

There are various restrictions inherent with in-line lamination of this type. The range of processing speeds during in-line lamination may be limited by the speed range of the filament extrusion process. It is possible, for example, that the speed at which the loose web of filaments is produced is higher than the optimum speed required for bonding. In these circumstances the heat transfer from the calender roll surfaces through the components of the laminate would be insufficient to effect adequate bonding between the component layers. It is also difficult to make products with more than two layers using this technique. For example, the production of a film sandwiched between two fabric layers requires two processing steps. In the first step a two component layer, nonwoven fabric plus membrane, is produced by the in-line process already described. In the second step, the product of the first step, a two component laminate, is re-processed by re-feeding it into the calender roll nip at position $A^1$ or $A^2$ of FIG. 1 and adding the second fabric layer sandwiching the film layer.

The development of off-line thermal lamination obviates many of these difficulties. In off-line lamination, the lamination of the component layers is conducted as a completely separate process from the production of any of the components. If a spunbonded fabric component is used, for example, it is obtained as a pre-formed, bonded fabric as opposed to the unbonded web of filaments used in in-line thermal lamination. This pre-formed material is then point laminated by a calender system similar to that used in the above described in-line point bonding. Fabrics, films, microfibre membranes, nets and other materials can be combined in ways that would be difficult or impossible in-line with a fibre or filament forming process such as spunbonding. Accordingly, off-line lamination provides the ability to better control the lamination process to achieve the desired component laminate.

The inventor has observed that there is a previously unreported significant problem with off-line lamination when point laminating an embossed material such as a point-bonded nonwoven fabric. More particularly, during the development of the off-line thermal lamination process, a standard commercial nonwoven spunbonded fabric was being laminated to a film. Both components were polypropylene based and were of a composition that was known to thermally laminate well. The spunbonded fabric had been bonded using a standard emboss pattern commonly used by many producers in the spunbonded nonwovens industry and the calender roll presented a commonly used point lamination pattern.

On laminating the fabric and film together, it was noticed that although the majority of the fabric and film has laminated well, there were patches where these materials were completely unlaminated. These unlaminated patches have the appearance of blisters in the laminate which have a minimum size of approximately 25 $mm^2$ but are typically of the order of 500 $mm^2$.

This irregularity was completely unexpected and, at first, was attributed by the inventor to incorrect processing conditions. Accordingly, the process conditions were altered in an attempt to attain an even level of lamination over the whole area of the fabric. Pressure, temperature, process speed and material tensions were all varied and the lamination process repeated in an attempt to attain even lamination. However, the variation of these parameters together and in combination did not obviate the problem and there was no obvious explanation for the effect.

Accordingly, it is an object of the present invention to overcome or at least obviate the problem outlined above and thereby to provide improved quality laminates.

The present invention resides in the appreciation that the above described problem with an off-line point lamination process is attributable to the interaction between the emboss pattern of the fabric with the lamination pattern of the calender roll. In particular, the present invention resides in the appreciation that when the emboss points of an embossed material to be laminated are in register with the lamination points of a point lamination pattern, poor lamination occurs leading to the problem of blistering.

The situation where the emboss pattern is in register with the lamination pattern is illustrated in FIG. 3. In order to laminate an embossed material 10 to another material 12, there must be sufficient bonding pressure exerted at each lamination point 14 of the lamination pattern 16 by the lamination calender roll 18. When a given lamination point 14 is in register with an emboss point 20 of the embossed material 10 (as shown in FIG. 3) there is insufficient solid thickness of the embossed material 10 and other material 12 to exert the required lamination point pressure. However, when the lamination point 14 is out of register with the emboss point 20 of the embossed material 10 as illustrated in FIG. 4, there is sufficient solid thickness of the materials 10, 12 to provide the required lamination point pressure. This problem occurs even if the embossed material 10 is reversed such that a smooth surface 22 of the embossed material 10 is presented to the lamination calender roll 18.

Having appreciated the above the present invention provides, according to one aspect, a method of laminating a first material having a point emboss pattern formed thereon, to a second material, by a lamination process using a point lamination pattern, wherein one or more characteristics of the two patterns is selected and differentiated to control, during lamination, the amount of point mis-registration between the two patterns.

It is to be appreciated that the term 'material' has, in the context of the present invention, a broad meaning in that it covers all types of substantially planar materials which are suitable for lamination. For example, the term material is intended to cover sheets, webs, fabrics, textiles, lamina etc. which can be laminated to other sheets, webs, fabrics, textiles, lamina etc. to form a laminate. An embossed material is therefore to be considered as any sheet, web, fabric, textile, lamina etc. which has raised or depressed formations provided in its surface.

In view of the present invention, a detailed explanation of why the problem occurred in the above described lamination process can be given.

Emboss patterns can be defined by the shape of the emboss points, the area of the emboss points expressed as a percentage of the total area (also referred to as the percentage bonding area), the axes of the alignment of emboss points, and the pitch i.e. the distance between the emboss points. Lamination patterns can also be described in a similar way, though instead of percentage bonding area, the percentage contact area of the point lamination pattern is considered.

Referring to FIG. 5, the standard emboss pattern 24 of the fabric used in the above off-line lamination process had approximately a 19% bonding area, square-shaped emboss points 26, its emboss points aligned along orthogonal axes X, Y at 45°/45° to the rotational axis R of the calender roll, and a pitch P of approximately 1.75 mm. The axes X, Y are also symmetrical about line AA which is transverse to the rotational axis R. This pattern is one of the most commonly used embossing patterns for the manufacture of spunbonded nonwoven fabrics and is almost identical to the point lamination pattern of the calender roll used for the off-line lamination process.

The standard lamination pattern used was identical to the emboss pattern except for a very slight difference in pitch. The pitch of the lamination pattern was approximately 1.75 mm but slightly larger than that of the emboss pattern.

Referring to FIG. 5A, when the fabric and film were laminated, unlaminated patches occurred only in areas (I) where the lamination points of the calender roll and the emboss points 26, already present in the spunbonded fabric, were in register with each other. In the areas (O) where the lamination points of the calender roll did not coincide with the emboss points 26 of the fabric (out of register), the materials were well laminated. It is to be noted that only for the purposes of illustration, the size of the emboss points 26 has been reduced in FIG. 5A for the purposes of differentiation from the lamination points: this makes no material effect upon the results.

The unlaminated patches occurred in an approximately regular pattern over the surface of the laminate. This is because of the slight difference between the pitches of the standard emboss pattern 24 and the standard lamination pattern used. The resultant pattern on the laminate can be likened to an interference pattern (such as a Moiré interference pattern) between two signal point sources, with the blisters occurring at positions where the two signals are substantially in phase.

It follows that it is particularly disadvantageous to thermally laminate using a lamination pattern which is the same as, or very similar to, the bonding pattern of any of the component layers, as was the case with the above described lamination process. The problem cannot be overcome by simply increasing the applied pressure between the two calender rolls. Although this would ensure that enough pressure was provided at the in-register points (FIG. 3) to effect good lamination, at the out-of-register points (FIG. 4) there would be too much pressure leading to damage of at least one of the laminate's layers.

There are several reasons why this problem may not have been addressed previously. One such reason is that it may have been unnoticed because the blistering effect does not appear to occur to such a dramatic degree in relatively thin materials. The inventor's further trials have shown that when lightweight fabrics, for example having a weight of 35 g/m$^2$, are processed there are no visible unlaminated areas. This is because these light-weight materials are thin and do not require as much energy (provided by heat as well as pressure) to bond the layers together. However, the resultant laminate can have an unattractive (non-uniform) appearance and can even appear to be uneven and wrinkled. With knowledge of the invention, this irregular appearance can be attributed to the non-uniform conditions present at each lamination point which lead to non-uniform lamination pressures at these points.

Another commercial reason is that if a laminate is produced in-line by a spunbond material producer, the producer may use the same embossed calender roll in both the bonding and the laminating stages of manufacture. This would lead to the same bonding (and laminating) pattern being used in this manufacturing process. Accordingly, the producer may then simply accept what comes out of the process.

If the manufacturer saw the appearance of these non-lamination effects and slowed down the whole lamination process to increase the dwell time at the nip, more energy in the form of heat would be put into the lamination process. If the material being laminated had a weight slightly above 50 g/cm$^2$, such that it would normally show poor lamination effects, then the increased input energy may be sufficient to prevent the direct visual appearance of these effects, though not the actual occurrence of differences in lamination. This may be a further reason why manufacturers have not addressed this problem previously.

When using heavier and hence thicker materials, in particular when using embossed materials having a minimum weight of approximately 50 g/m$^2$, the problem of blistering becomes readily apparent. In fact, the manifestation of the blistering effect appears to increase with increasing fabric thickness. If the problem had been noticed previously, alternative methods of lamination, for example continuous area lamination rather than discreet point lamination, may have been used to simply avoid the problem occurring. However, such alternative lamination processes each have other undesirable disadvantages in comparison with off-line point lamination.

In the practical application of the present invention, the selection and degree of differentiation between the one or more characteristics may be arranged to maximize the amount of point mis-registration between the two patterns. When point mis-registration is maximized, the greatest degree of lamination occurs because the highest percentage of lamination points actually bond the first and second materials together. This advantageously increases the value of a laminate peel-apart strength characteristic.

The selection and degree of differentiation between the one or more characteristics may be arranged to control the size of areas in the resultant laminate containing groups of adjacent points in each pattern which are in registration, in order to avoid the visual appearance of non-lamination effects, such as blistering, occurring in the resultant laminate. In particular, the areas are preferably smaller than 25 mm$^2$. However, because the present invention enables total control of the resultant interference pattern caused by the emboss and lamination patterns, it is possible to produce any desired effects in the laminate. Accordingly, the patterns can be selected to produce, in a controlled manner, special effects in the laminate even such as predetermined areas of non-lamination, if required. Also various characteristics of the embossing pattern and lamination pattern can also be selected and differentiated to provide a resultant aesthetically pleasing finish on the surface of the laminate.

The term characteristic is intended to mean any geometric parameter of the patterns which can be altered to effect a geometric difference between the emboss pattern and the lamination pattern. In the embodiments of the present invention, the characteristics of the patterns which may be differentiated, either individually or concurrently, are: the axes of alignment of the emboss points of the emboss pattern and of the lamination points of the lamination pattern, preferably when the axes are orthogonal to each other; the pitch between emboss points or between the lamination points; the percentage bond area of the emboss pattern or the percentage contact area of the point lamination pattern; and the shape or size of each emboss point of the emboss pattern or each lamination point of the point lamination pattern.

In an embodiment of the present invention, a lamination pattern on the calender roll is used that is significantly different from the embossing pattern of the components (material layers) being fed into the laminator. In particular, two patterns that are nominally the same, in order to give a desired aesthetic finish to the laminate, can be sufficiently differentiated, for the purposes of the present invention, simply by turning the orthogonal axes of one of the patterns so that groups of lamination points and emboss points are not coincident.

A limitation of the thermobonding process is that the components must have similar softening and melting points and be of similar chemical composition for adequate bonding to occur by heat and pressure. For instance, it is not possible to combine a polyethylene film with a polypropylene spunbond fabric by heat and pressure alone. The conventional solution to this problem is to use an adhesive lamination.

Nearly all adhesive lamination systems involve an adhesive being applied to one to more substrates. During the process, the materials might be heated and pressed together to form a bond and afterwards processed through a drier to evaporate off any solvents or carrying solutions. However, the problem with all adhesive systems is that they only apply the adhesive to the surface of the material. As a result, the bond is only as good as the adhesion of the adhesive to the surface of any one of the component materials.

A new solution to the problem outlined above is to bond together dissimilar materials using the calender point bonding method described above in conjunction with the provision of a thermoplastic adhesive layer between the first and second materials. The adhesive can be provided as a coating on one of the first and second materials which can then be passed through a thermobonding calender that melts the adhesive as it passes through. Subsequent cooling of the laminate sets the melted adhesive thereby bonding the materials together.

The thermoplastic adhesive layer and the first material, a polymer in this case, can pass through the thermobonding calender such that they are caused to melt together to form an integrated bond. The integrated bond can be considered to be formed by heat being transferred from the outside to the inside of the laminate and also by the adhesive effects spreading from the inside to the outside of the laminate.

The significant difference between passing the materials between a flat nip and a point bonding nip is that the point bonding nip is designed to fully 'wet-out' the two surfaces to be bonded together. The term 'wet-out' is used as an adhesives expert would use it, namely not implying that any water is involved but that the adhesive flows into intimate contact with the surfaces. A point lamination process applies frictional forces to due to the localised pressure exerted at the lamination points as well as heat. The inventor considers that a degree of mixing of the components occurs at the lamination points, i.e. mixing of the adhesive and the two materials being laminated together.

The second material preferably also comprises a thermoplastics material and can also be caused to melt to form part of the integrated bond. The integrated bond ensures integral strength in the laminate and provides a high peel apart resistance indicative of a strong lamination between the component layers of the laminate.

In this process, adhesive bonding occurs predominantly at the lamination points of the roll and not in the intermediate areas which makes it possible to bond a very wide range of products. This confers significant advantages over all-over adhesive bonding with certain materials. For example, when bonding a moisture vapour permeable film to a fabric layer, the flexibility and moisture vapour permeability of the product may be retained to a greater extent.

In the known production of breathable laminates, it is often necessary to apply the adhesive to one of the materials (usually the thinnest) in a discontinuous manner. This is because the materials are usually laminated together using a flat nip, namely by use of smooth calender bonding surfaces, which compresses the whole structure together. Conventionally, a discontinuous coating can be achieved by spraying or printing a discontinuous pattern of hot melt adhesive onto one of the materials. Also it is possible to powder coat adhesive onto the surface of a material by use of a dusting procedure. However, each of these methods involves additional cost and complexity in the lamination process.

Advantageously, the present invention permits the use of a simple smooth transfer roll for transferring adhesive onto one of the materials without the need to ensure that the coating is discontinuous. The discreet point bonding effected by the lamination pattern on the calender roll ensures that the adhesive is only melted and sealed at discreet points thereby ensuring the desired breathability in the laminate. This advantageously obviates the need for a specialist discontinuous coating process.

It is also possible to achieve an acceptable adhesive bond using "unlike" polymers in each layer of the laminate. For example, it is not possible to achieve an acceptable bond between a spunbond fabric and a meltblown fabric using an adhesive in the conventional way because the surface of the meltblown fabric, which has short fibres, has no integral strength and therefore the adhesive will peel away easily from the meltblown fabric. However, using an embossed thermobonding calender roll, a polypropylene spunbond material can be bonded well to a polypropylene meltblown material using an adhesive layer. It was also noted that, using the same adhesive, the polypropylene spunbond material achieved a better bond through this process than through a traditional laminator.

Furthermore, it is possible to combine unlike polymers such as a cheap polyethylene film to a polypropylene spunbond material. This has the advantage of enabling the lamination process to operate at twice the normal speed because it would no longer be necessary to worry about dwell time. Thus it is possible to laminate together a first material having a chemical composition which is unsuitable for bonding to the second material by heat and pressure alone.

There is another significant advantage to using an adhesive as described above: it becomes possible to bond thermoplastics materials to non-thermoplastics materials, for example technical nonwoven materials to woven textile materials such as fabric finishes. More specifically, using an adhesive in a point bonding process it is possible to laminate a meltblown nonwoven material to a cotton fabric whereby the bonding points on the meltblown have their microfibres melted into a film. The resultant laminate can be used as an allergy barrier textile, for example.

Thus, it is to be appreciated that using adhesive point lamination, the first and/or second materials may comprise discontinuous fibres which are melted by the lamination process to form a film at the adhesive lamination points.

Alternatively, the textile material can be point laminated to a polymer film using the adhesive layer and a spunbonded material could be point bonded to the polymer film all in a single pass through a laminator. The resultant laminate has use for applications such as leisurewear. Also this process advantageously enables the manufacture of very low-cost breathable fabrics for the garment industry.

A small amount of thermoplastic adhesive may also be an advantage when bonding similar materials together. In these circumstances, the bonding of the components may be enhanced by a combination of thermal bonding of components with similar melting points and composition supplemented by thermoplastic adhesive bonding activated at the lamination points.

Preferably, the lamination conditions are selected to melt and then subsequently set on cooling the thermoplastic adhesive layer in a single pass through the thermobonding calender. This speeds up the lamination process and obviates the need for a separate drying stage. The adhesive is preferably one or more of an acrylic adhesive, a hot melt adhesive, a netting adhesive or a powder adhesive.

The above advantages can also be realised in another different aspect of the present invention, namely in a method of laminating a first polymer material to a second material by use of a thermoplastic adhesive layer, wherein the thermoplastic adhesive layer, the first polymer material layer and the second material layer are passed through a point lamination calender and at least the adhesive and thermobonding layer are caused to melt together at the lamination points to form respective integrated bonds.

Preferably, the point lamination method according to the first aspect of the present invention further comprises coating the first material, the second material or the laminate with a chemical composition to import specific properties to the laminate. This is particularly useful where fire-retardant fabrics are required or laminates having a particular customer-specified finish.

The first material may comprise a nonwoven spunbonded textile which is preferably a polymer selected from the group comprising polypropylene, polyethylene, polyester or polyamide. If the first material has a weight of 50 $g/m^2$ or more, then the visual differences between the present invention and the prior art are more readily apparent.

The second material may comprise a thin film, having a weight of less than 50 $g/m^2$, and is preferably a polymer selected from the group comprising polypropylene, polyethylene, polyester or polyamide.

As mentioned earlier, the visual appearance of these effects is also dependent, to a lesser degree, upon the dwell time of the materials at the nip. If the material is being laminated at a slower speed (longer dwell time), more heat energy is put into the lamination process than if the lamination were proceeding at a higher optimum speed. Accordingly, the blistering effects which are visible when a 50 $g/m^2$ material is laminated at the optimal speed would now not be visible. However, this does not change the fact that the relative degree of lamination at the in register points and the out of register points is still significantly different. For commercial reasons there is a limit to which the lamination process can be slowed down and so the amount of variation of this border between the visibility and non-visibility of these effects can only be altered to a relatively small degree.

Two component films (two ply laminates) can be quite sensitive to the percentage of in-register areas. Using low-weight spunbonded fabrics this problem can be avoided but this leads to another problem in the damage of the low-weight spunbonded fabrics. One solution is to use a very thin fabric layer as a third layer in the laminate and to protect the thin third layer with the second layer. Three layer laminate is very strong and protects the second layer which is now sandwiched between the first and third layers. Accordingly, the method of the present point lamination invention may further comprise providing a further layer between first and second materials. The further layer is preferably a microfibre layer or a continuous thin film.

In the above described method according to the present invention, the lamination is effected by use of a thermobonding calender, the first material may have an emboss pattern which is non-symmetrical about a line transverse to an axis of rotation of a calender roll of the calender, and the first material may be reversible in orientation to present an emboss pattern having different pattern characteristics to that presented when the first material is not reversed.

Reversal of the first embossed material provides different resultant qualities in the laminate and can be achieved by simply turning over the first material so that its alternative surface is presented to the lamination calender roll. The advantage of this is that it is then possible to use a single emboss pattern on an embossed material to produce two quite different types of laminate which can provide large savings in cost because a single type of material need only be purchased in bulk to provide the two required types of laminate.

Preferably the reversed embossed pattern is sufficiently different to the non-reversed embossed pattern to provide under the same process conditions a different pressure distribution across the laminate. This enables from the reversal of a single pattern to obtain different laminate characteristics. For example, the non-reversed first material laminate may be substantially impermeable to water, whereas, the reversed first material laminate may be porous. Accordingly, the difference in pressure distributions preferably leads to perforation of the laminate when the first material is reversed and non-perforation when it is not reversed in orientation.

It is to be appreciated that the same effects of the first material pattern reversal may be achieved by 'relative reversal' of the pattern on the calender roll. In this case, the lamination pattern would have to be non-symmetrical about a line parallel to the axis of rotation of the calender roll. 'Relative reversal' could be achieved by reversing the rotation of the calender roll with respect to the materials to be laminated.

The present invention extends to an apparatus for laminating a first material having an emboss pattern formed thereon, to a second material, the apparatus comprising a lamination means for bonding the first and second materials together at discreet points, wherein the lamination means provides a point lamination pattern having one or more of its characteristics selected to be different to a corresponding one or more characteristics of the emboss pattern so as to control, during lamination, the amount of point mis-registration between the two patterns.

The first and second materials are preferably continuous sheets of material and the apparatus is preferably arranged to form a continuous laminate. Here the term continuous is a relative term which is intended to mean the length of the sheet is several orders of magnitude greater than the width of the sheet.

In an embodiment of the present invention, the materials are provided in the form of wound rolls and the apparatus comprises means for unwinding and flattening the materials prior to lamination. Furthermore, the lamination means comprises an embossed thermobonding calender roll.

The apparatus may further comprise means for cooling the laminate after the lamination process. Also, the apparatus may further comprise means for treating the laminated material with a chemical composition after the lamination process.

According to another aspect of the present invention there is provided a method of point bonding two lamina together, the method comprising: selecting an emboss pattern, which is applied to one of the lamina, selecting a point bonding pattern, which is to be used for bonding the two lamina together, and point bonding the two lamina together using the point bonding pattern, wherein the selection steps are arranged to differentiate a characteristic of the two patterns to establish a predetermined amount of point mis-registration between the two patterns.

Presently preferred embodiments of the present invention will now be described by way of example with reference to the accompanying drawings. In the drawings.

Figure 15A:
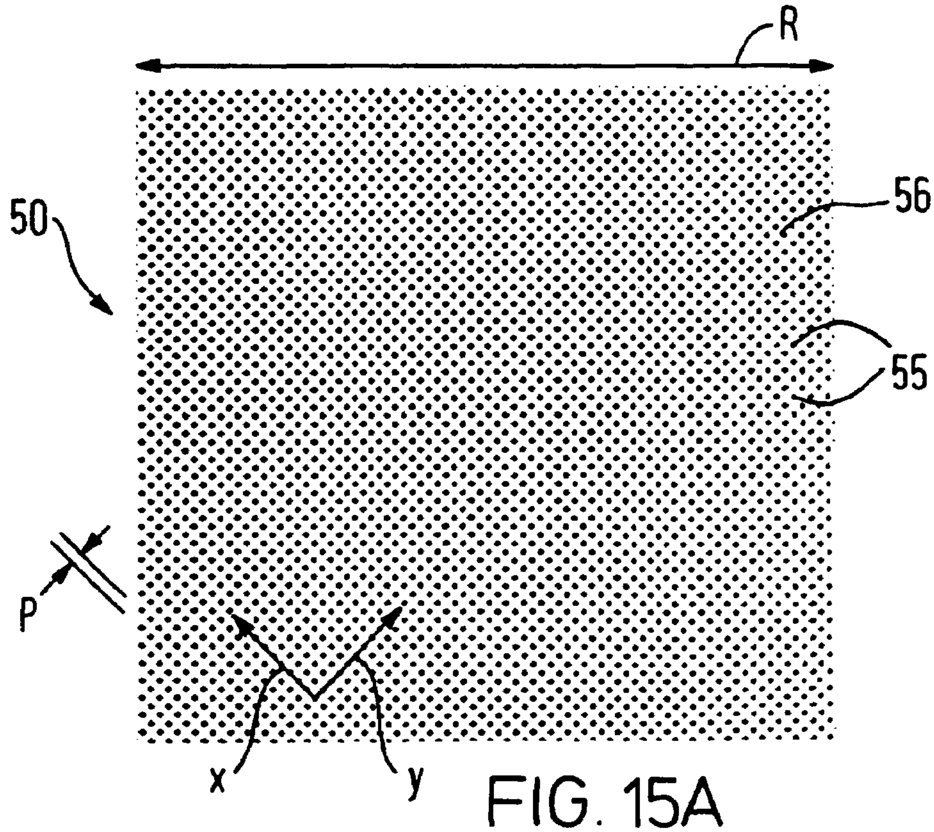
FIG. 15A is a plan view of emboss pattern of a 19% square 4°/45° lamination pattern of a point lamination calender roll used in the fourth embodiment of the present invention.
Figure 15B:
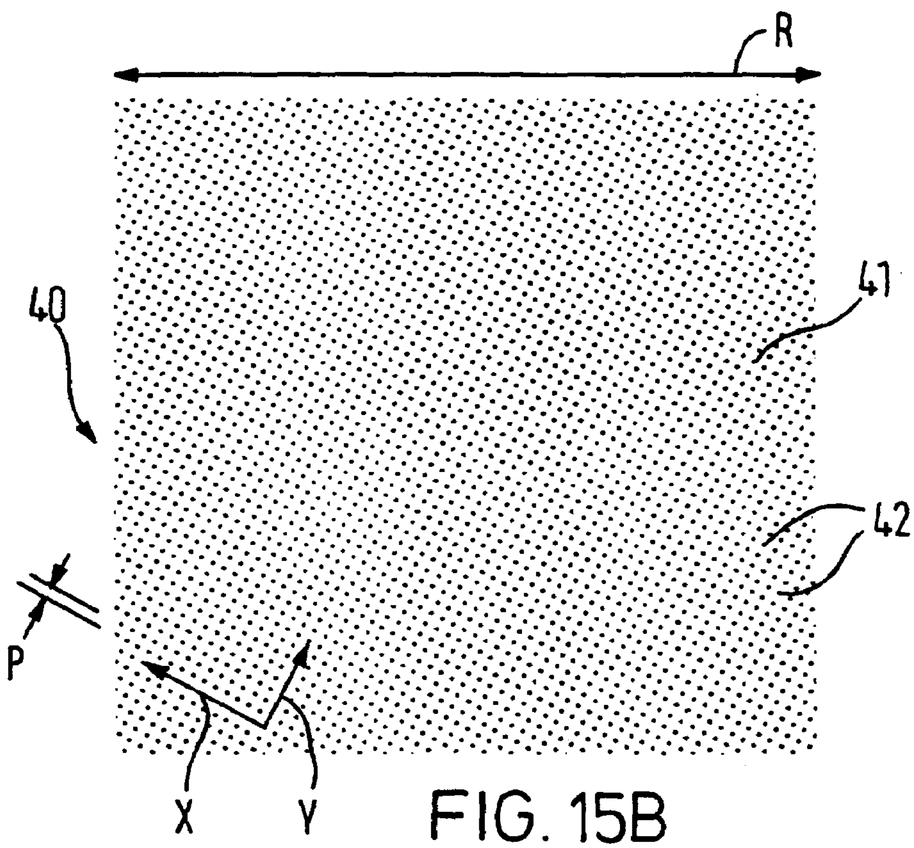
FIG. 15B is a plan view of emboss pattern of a 9% round 60°/30° a point bonded fabric used in a fourth embodiment of the present invention.
Figure 16A:
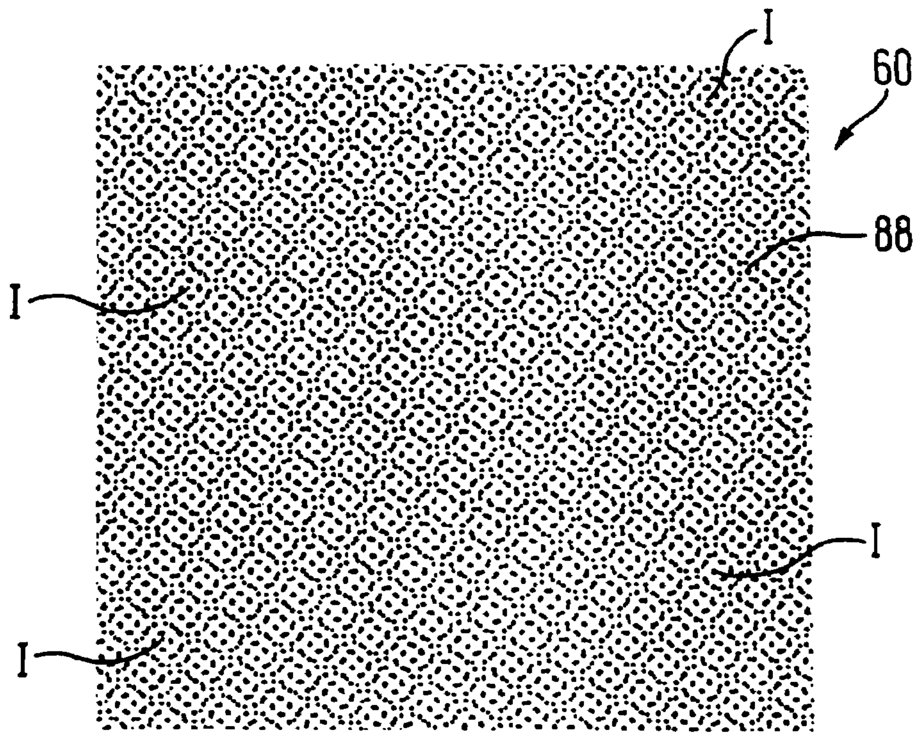
FIG. 16A is a plan view of the resulting interference pattern of the fourth embodiment created by laminating the point bonded fabric of FIG. 15B using the point lamination pattern of the calender roll of FIG. 15A.
Figure 16B:
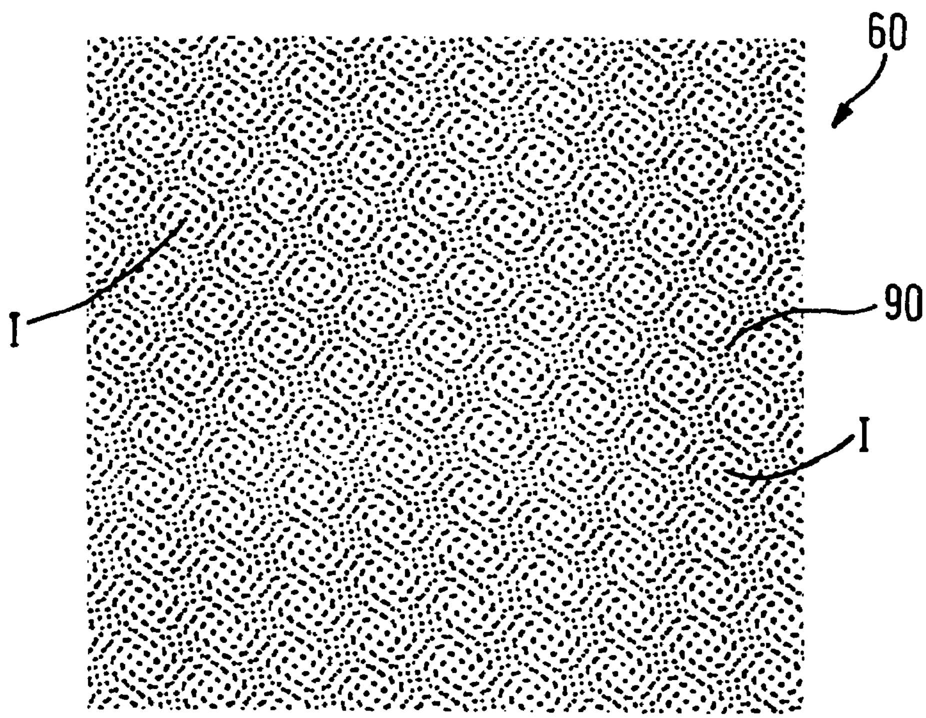
Figure 17:
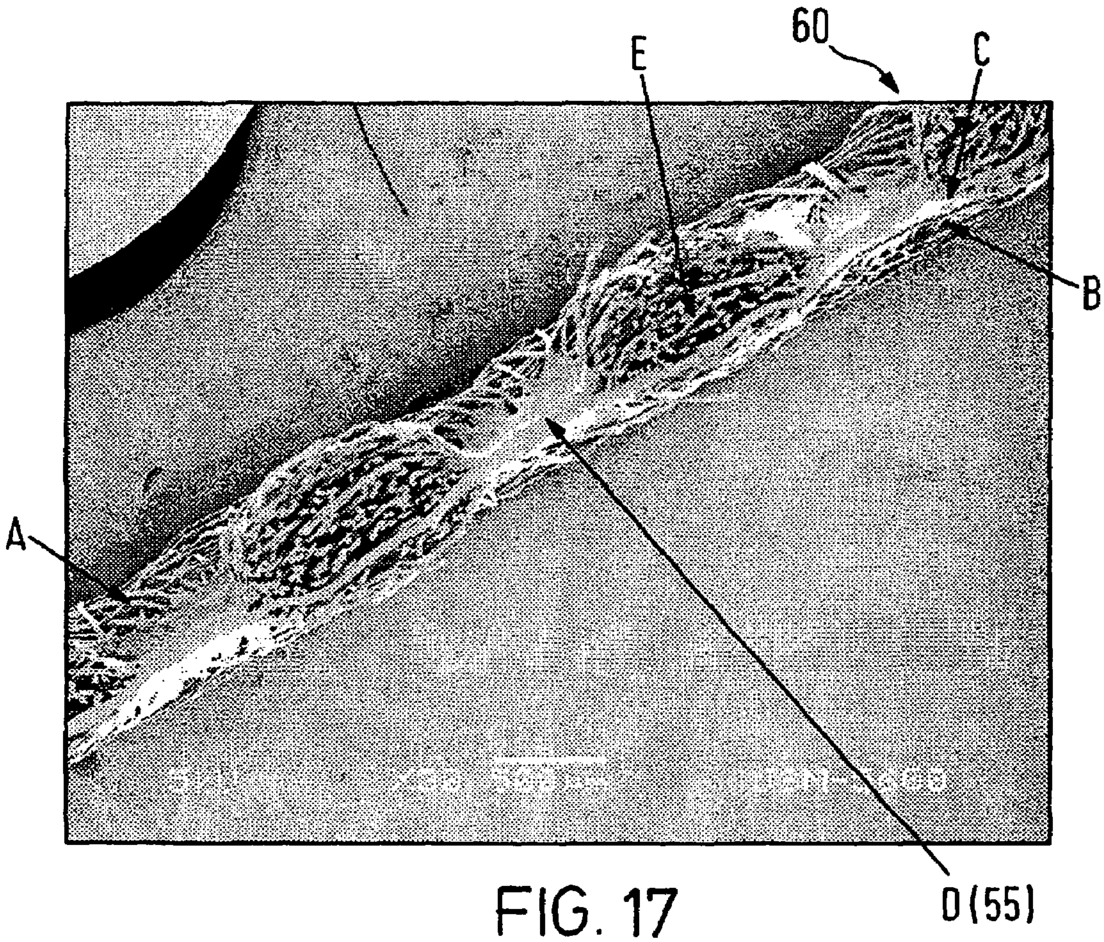

FIG. 16B is a plan view of the resulting interference pattern of the fourth embodiment created by reversing the point bonded fabric of FIG. 15B and then laminating the same using the point lamination pattern of the calender roll of FIG. 15A; and FIG. 17 is a cross-sectional view photomicrograph of the surface of a three component laminate made as a modification of the first, second or fourth embodiments.

Figure 6:
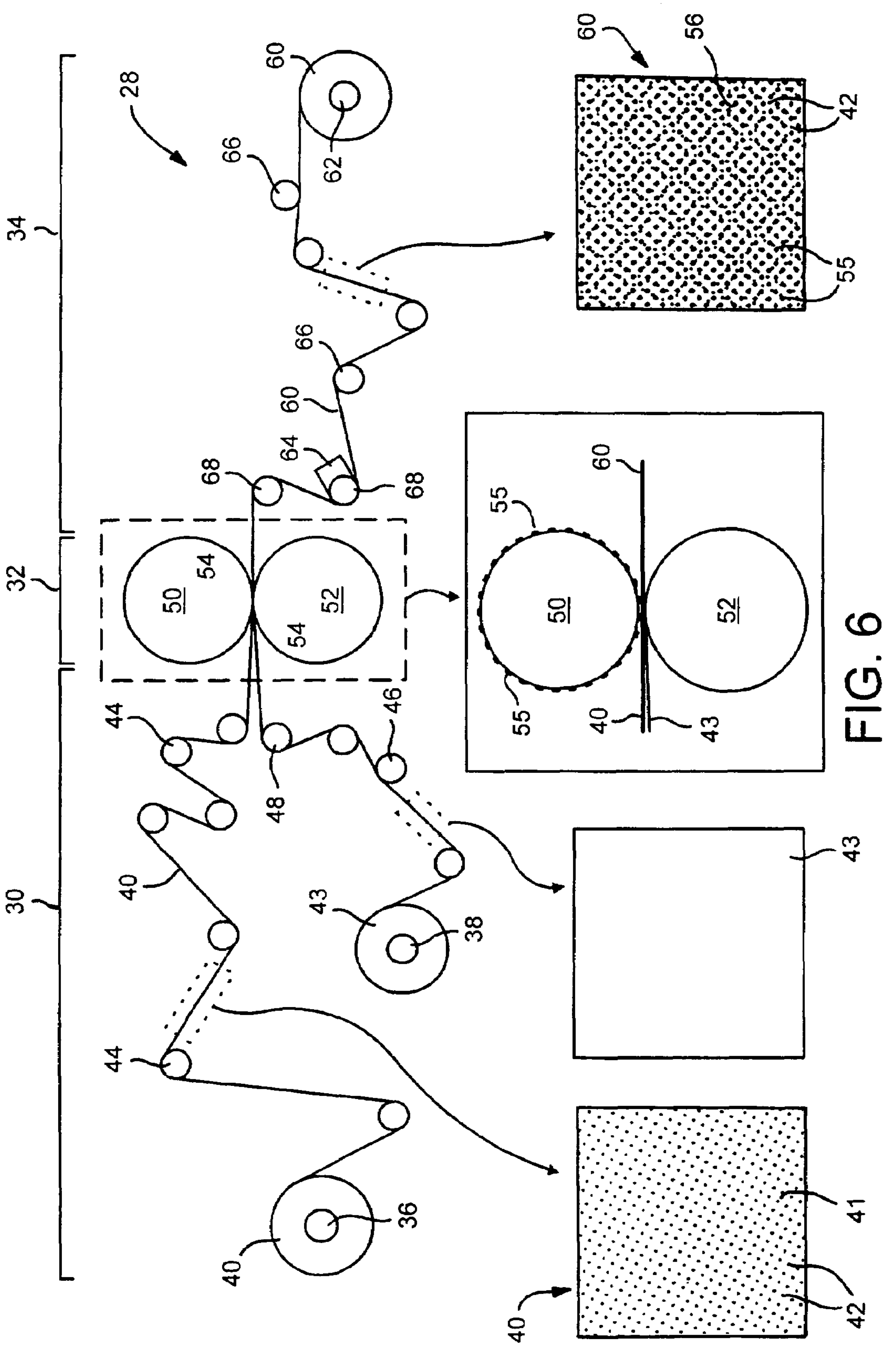
FIG. 6 is a schematic diagram showing a three stage lamination apparatus arranged to carry out each of the embodiments of the present invention.

Referring to FIG. 6, there is shown a lamination apparatus which is used in carrying out each of the preferred embodiments of the present invention.

The lamination apparatus 28 comprises three different sections 30, 32, 34. In the first section 30, two materials to be laminated are provided and are individually put into condition for laminating. In the second section 32, the two materials are brought together and laminated. In the third section 34 the laminated materials are collected for subsequent finishing processes. Each of these three sections is now described in greater detail.

The first section 30 includes a first feeder core 36 and a second feeder core 38 situated at one end of the lamination apparatus 28. The first feeder core 36 retains a roll of embossed material 40 having an emboss pattern 41 with a plurality of emboss points 42 provided thereon, whereas the second feeder core 38 holds a roll of non-embossed material 43 which is to be laminated with the embossed material 40.

The embossed material 40 is drawn off the first feeder core 36 and is unwound by seven flattening rollers 44 which are arranged to form a tortuous path for the embossed material 40 to travel through to reach the second section 32 of the apparatus 28. The purpose of the seven flattening rollers 44 is to flatten the previously wound embossed material 40 and to maintain tension in the supply of the embossed material 40 to the second section 32.

The non-embossed material 43 is drawn off the second feeder core 38 and is unwound by four flattening rollers 46 which are arranged to provide a tortuous path for the non-embossed material 43 from the second feeder core 38 to the second section 32. These four flattening rollers 46 provide tensioning and assist in the flattening of the non-embossed material 43. The last of these four flattening rollers, closest to the second section 32, is a motor-driven spreader roller 48 which has special formations for laterally spreading the non-embossed material 43 along the axis of the spreader roller 48. A spreader roller is used for the non-embossed material 43 because it is usually of a light-weight type and so has a tendency to crease or gather towards its centre.

Whilst in the above described apparatus 28 groups of seven and four rollers 44, 46 have been used, any number in any configuration could be used as appropriate to effect flattening of the embossed and non-embossed materials and to provide sufficient tensioning. In general, the shorter the distance from the feeder core 36 to the second section 32 the better. However, because in practice the feeder core 36 must be a certain distance away from the second section 32, then the tendency of the material to crease can be significantly reduced by passing it through a tortuous path using the rollers 44, 46. Also these rollers 44, 46 allow for handling of the materials without detrimental effect to the process.

The second section 32 comprises two motor-driven oil-heated calender rolls 50, 52 which are located vertically adjacent each other with the rolls just touching each other when no material is provided between them. The point of contact between the calender rolls 50, 52 provides a nip 54 through which the previously flattened embossed and non-embossed materials pass. In use, the two calender rolls 50, 52 are held apart by the materials being processed, to an extent dependant primarily on the thickness of the materials and the set pressure.

Heating of both the upper and the lower calender rolls 50, 52 is achieved by thermostatically regulating the temperature of oil passing through each calender roll. The calender rolls 50, 52 are heated to temperatures which are dependent upon the melting point of the materials being laminated. For example, if the materials comprise polypropylene which has a melting point of 165° C., the oil of the upper calender roll 50 is maintained at a temperature of 173° C. and the oil of the lower calender roll 52 is maintained at a temperature of 153° C. These oil temperatures provide a temperature at the calender roll surface which is just below the melting temperature of the materials being laminated.

The pressure applied by the calender rolls 50, 52 to the materials 40, 43 can be varied. In order to determine the pressure actually applied in the process, pressure readings can be taken at the calender rolls' hydraulic valves (not shown) which attempt to maintain a nip size of zero during the lamination process. The application of pressure to the two materials and the rotation of the calender rolls causes the material to be pulled into the nip 54. Typically, the pressure is set to level which equates to 50 to 70 Kg/cm. This is a one dimensional value because it is dependent on the width of the materials being laminated. For a set pressure level, a higher pressure is applied by the calender rolls 50, 52 to a narrow material than to a full width one.

In use, the heat and the pressure applied by the calender rolls 50, 52 at the nip 54 act to laminate the two materials 40, 43 together. The speed of rotation of the calender rolls 50, 52 is kept constant and has to be considered with other factors such as the pressure applied, the melting point of the materials used and the temperature of the lamination process. The calender roll speed determines the amount of time the two materials are subject to the pressure and heat at the nip 54. Accordingly, the speed has to be set to ensure enough exposure time is given for the heat and pressure lamination to occur.

In order to effect lamination, the upper calender roll 50 has a plurality of raised bosses, each boss providing a lamination point 55. The bosses are arranged in a pattern, hereinafter referred to a lamination pattern 56, on the surface of the upper calender roll 50 whilst the lower calender roll 52 has a smooth surface. (The precise details of the lamination pattern 56 used are described later in this description together with details of the interaction between the lamination pattern 56 and the emboss pattern 41 of the embossed material 40.) The two materials 40, 43 are point bonded (point welded) together at the nip 54 where raised bosses of the upper calender roll 50 compress the materials against the smooth surface of the lower calender roll 52. The heat of the calender rolls 50, 52 melts the fibres in each of the embossed and non-embossed materials 40, 43 and, together with the pressure applied at lamination points 55 of the lamination pattern 56, acts to create a point-bonded laminate 60 of the two supplied materials 40, 43.

The third section 34 comprises a removable finishing core 62 onto which the laminated material 60 can be wound after it leaves the nip 54. The finishing core 62 is rotated by a motor to collect the laminate. The speed of rotation is automatically varied to ensure that the speed of winding the laminate onto the finishing core matches the speed of lamination of the materials 40, 43 at the second section 32.

In between the finishing core 62 and the nip 54 of the second section 32, a printing device 64 is provided for printing the company identifier and/or a laminate descriptor onto the laminate. Also provided is a treatment device (not shown) which, when required, treats the laminate with a chemical for imparting specific qualities to the laminate 60, for example, the treatment chemical comprises a fire retardant or chemical protector. The laminate 60 passes over six rollers 66 which are arranged to form a tortuous path for the laminate 60 to travel through to reach the finishing core 62. Two of these rollers are motor-driven cooling rollers 68 provided in an s-shaped configuration. These rollers 66, 68 cool the laminate 60 to allow it to set prior to collection on the finishing core 62.

Once a complete roll of the finished laminate 60 is obtained, it can be removed and taken to a cutting device (not shown). The cutting device trims off the edges of the laminate 60 to provide a customer-determined width of laminate. Trimming the edges in this way obviates the need for accurate registration of the widths of the embossed and non-embossed materials 40, 43 during the lamination process and also allows for non-equivalent widths of embossed and non-embossed materials to be used.

It is to be appreciated that the laminating apparatus 28 described above can be used to laminate a wide variety of materials. The particular selection of characteristics (geometric parameters) of the lamination pattern 56 on the upper calender roll 50 and of the emboss pattern 41 on the embossed material 40 not only establishes the way in which the supplied materials will bond together to form the laminate 60, but also determines some of the important functional qualities of the laminate 60. In particular, control of the degree of mis-registration of the points of each pattern, i.e. non-overlap of emboss points 42 and lamination points 55, controls the effectiveness of the lamination process: the most effective point lamination taking place when the points 42, 55 are out of registration and minimal lamination occurring if the points 42, 55 are in register. Control of this interference or interaction between these two patterns 41, 56 can be used to enhance functional properties, such as permeability, of the laminate.

The geometric characteristics of the emboss pattern 41 and the lamination pattern 56 which are varied in the presently preferred embodiments to produce the desired effects are: the orthogonal pattern axes, the pitch (the pitch between emboss points), and the percentage bond area. It is to be appreciated that varying some of these factors can effect the values of other factors. For example, varying the pitch will affect the percentage bond area if the size of each emboss point 42 is to be kept constant. Alternatively, if the percentage bond area is to be kept constant, then varying the pitch will affect the size of each emboss point 42. Other conventional factors such as material weight per square meter which determines the thickness of the material, and chemical composition of the material can also be selected in order to provide different laminate properties.

The following presently preferred embodiments of the invention utilise the above described apparatus and accordingly, further description of the apparatus is omitted. However, the various characteristics of the two patterns 41, 56 used are varied from embodiment to embodiment to give different interference results as is described below.

It is also to be appreciated that in the presently preferred embodiments, the embossed material 40 is made from a spunbond or spunlaid process whereby filaments are bonded together to form a continuous sheet or web. Accordingly, the emboss pattern 41 for these materials is hereinafter referred to as a bonding pattern 41.

Figure 7A:
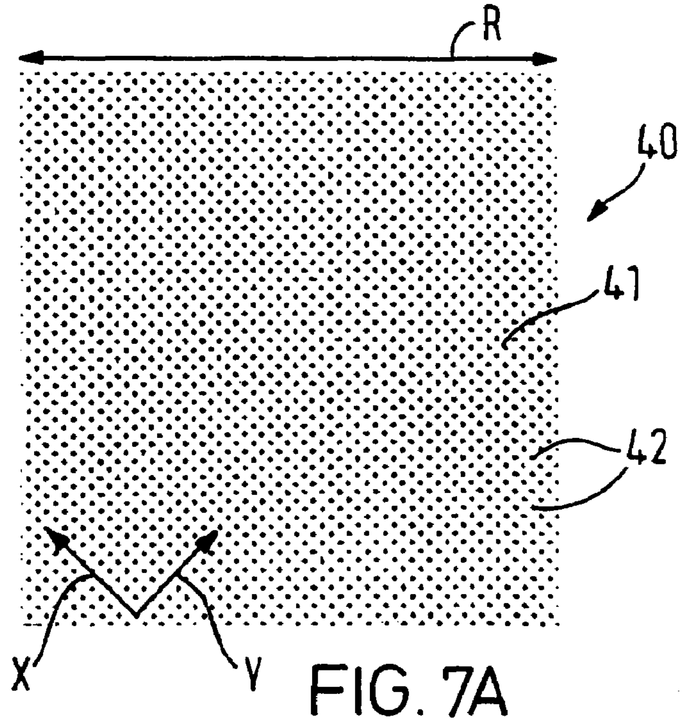
FIG. 7A is a plan view of a 19% square 45°/45° emboss pattern of a point bonded fabric having a pitch of approximately 2.1 mm as used in a first embodiment of the present invention.

A first embodiment of the present invention is now described with reference to FIGS. 7A, 7B and 7C. In this first embodiment, the lamination pattern 56 on the calender roll 50 and the bonding pattern 41 on the embossed material 40 have matching pattern axes x, y, and X, Y but different pitches. FIG. 7A shows the bonding pattern 41 on the embossed material 40 which is a spunbonded polypropylene fabric having 19% bond area, namely where 19% of the area of the fabric is point bonded during its manufacture. The weight of the fabric is 70 g/m$^2$. The bonding pattern 41 comprises an array of square-shaped bond points 42 having a pitch of approximately 1.75 mm. The array of bond points 42 have orthogonal axes X, Y which are each off-set by 45° to the rotational axis R of the calender roll 50.

Figure 7B:
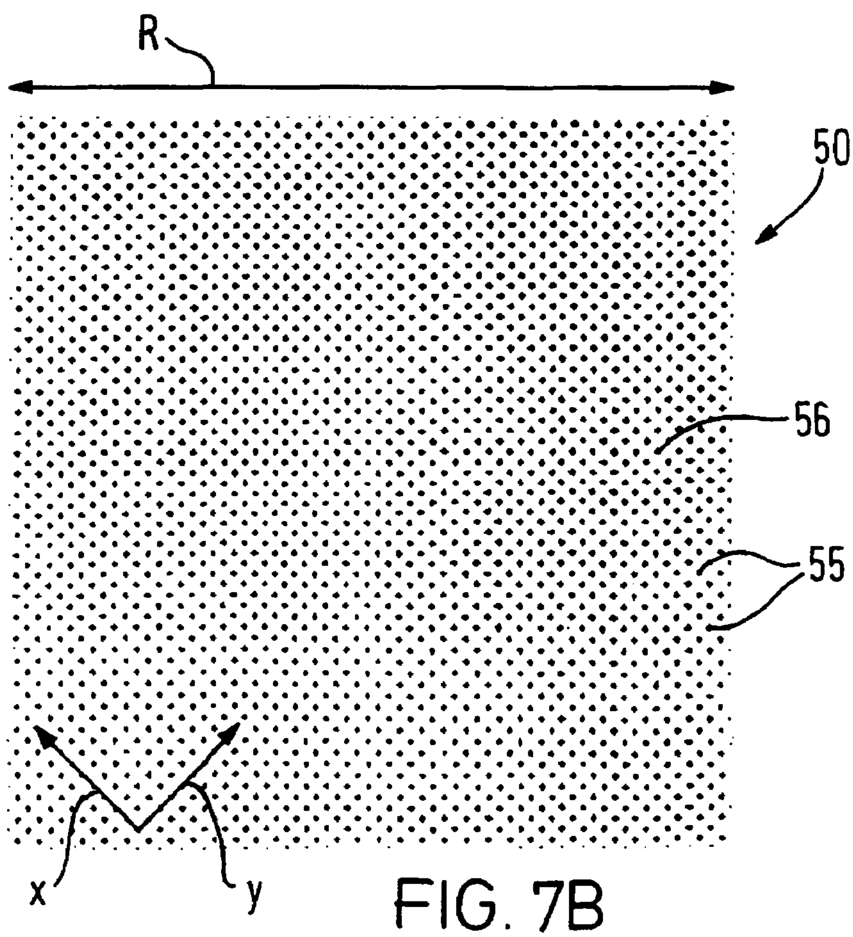
FIG. 7B is a plan view of a 19% square 45°/45° lamination pattern of a point lamination calender roll having a pitch of approximately 1.75 mm used in the first embodiment of the present invention.
Figure 7C:
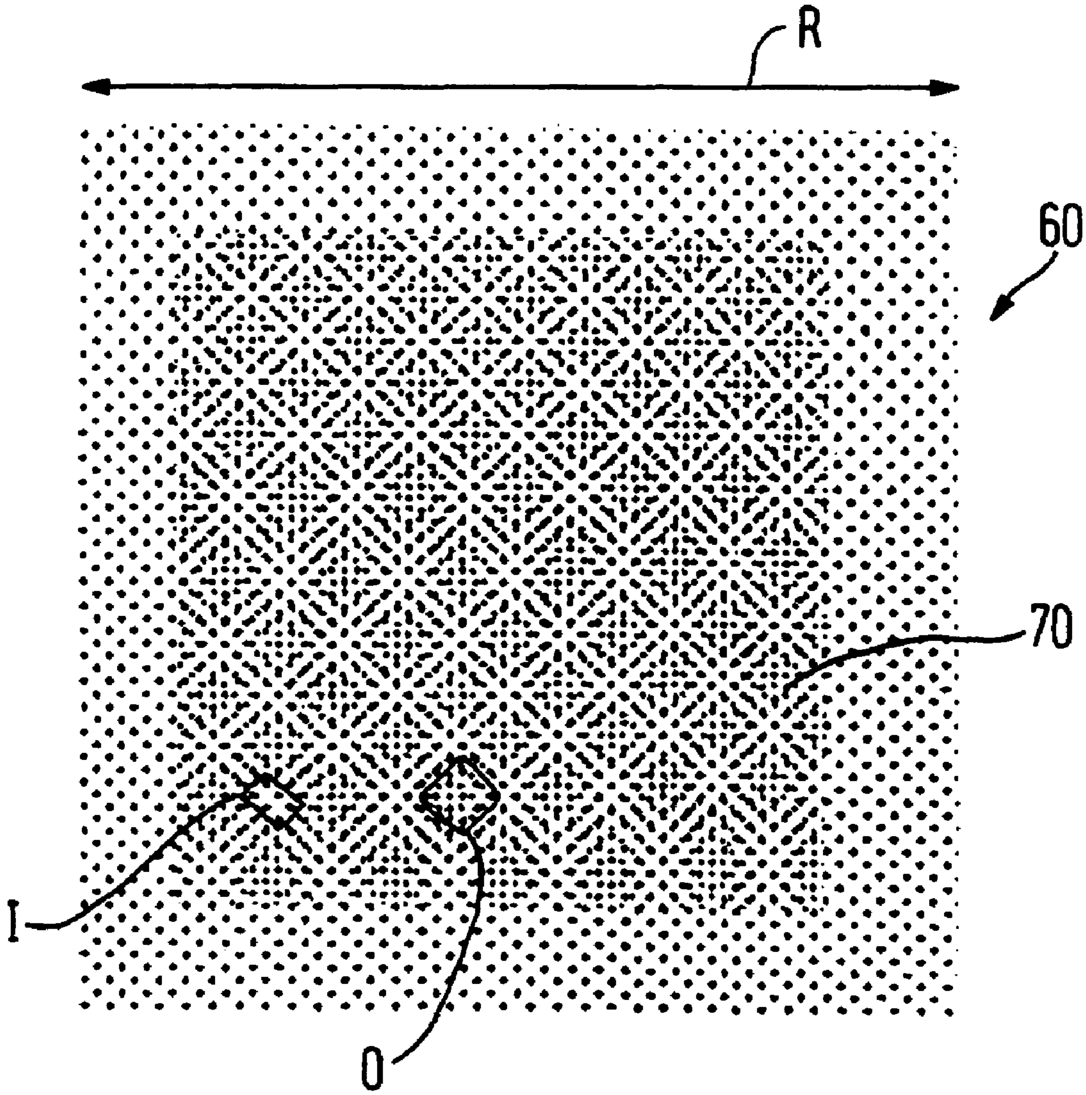
FIG. 7C is a plan view of the resulting interference pattern of the first embodiment created by laminating the point bonded fabric of FIG. 7A using the point lamination pattern of the calender roll of FIG. 7B.

The lamination pattern 56 on the calender roll 50 is illustrated in FIG. 7B and has a 19% contact area. The lamination pattern 56 comprises an array of square-shaped lamination points with a pitch of approximately 2.0 mm. As with the bonding pattern 41 of the embossed material 41 of the embossed material 40, the lamination pattern 56 has orthogonal axes x, y which are each offset by 45° to the rotational axis R of the calendar roll 50. This pattern 56 is one of the most frequently used in the off-line lamination processes.

The above described fabric (embossed material) 40 is laminated with a plain lightweight polypropylene film non-embossed material) 43, which has a weight of 25 g/m$^2$. During lamination, the patterns on the fabric 40 and on the calender roll 50 create an interference pattern 70 which is seen in the resultant laminate 60 as shown in FIG. 7C. As described earlier, the areas where the two patterns 41, 56 are out of registration (O) represents optimal bonding between the fabric 40 and the film 43. However, in areas where the patterns 41, 56 are in register (I), bonding between the fabric 40 and the film 43 is not optimal, if there is any bonding at all. Nevertheless, the prior-art problems of large areas of the laminate 60 not being bonded together is avoided because the size of areas of point registration between the patterns 41, 56 are kept to a predetermined maximum which is small enough to avoid the problem occurring.

The applications for such a laminate are numerous. For example, the laminate could be used for roofing underlay, or other applications in the building industry, for bedding protection or for protective wear garments.

Figure 8A:
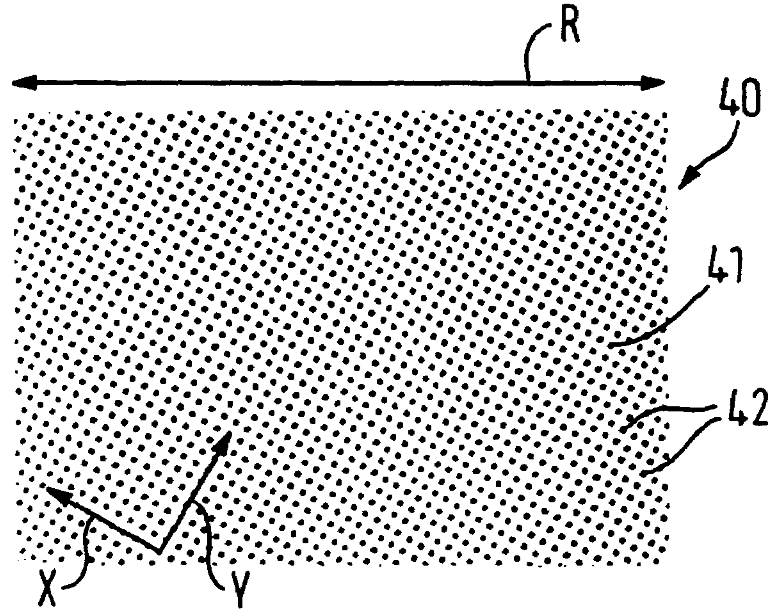
FIG. 8A is a plan view of a 19% square 60°/30° emboss pattern of a point bonded fabric used in a second embodiment of the present invention.
Figure 8B:
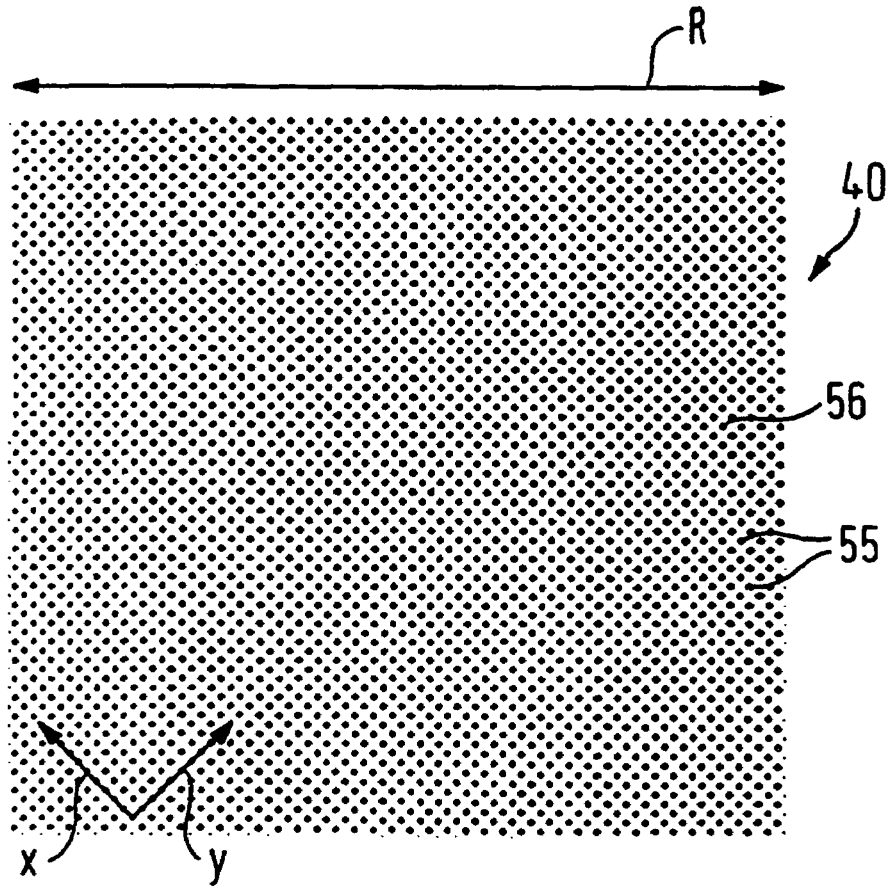
FIG. 8B is a plan view of a 19% square 45°/45° lamination pattern of a point lamination calender roll used in the second embodiment of the present invention.
Figure 8C:
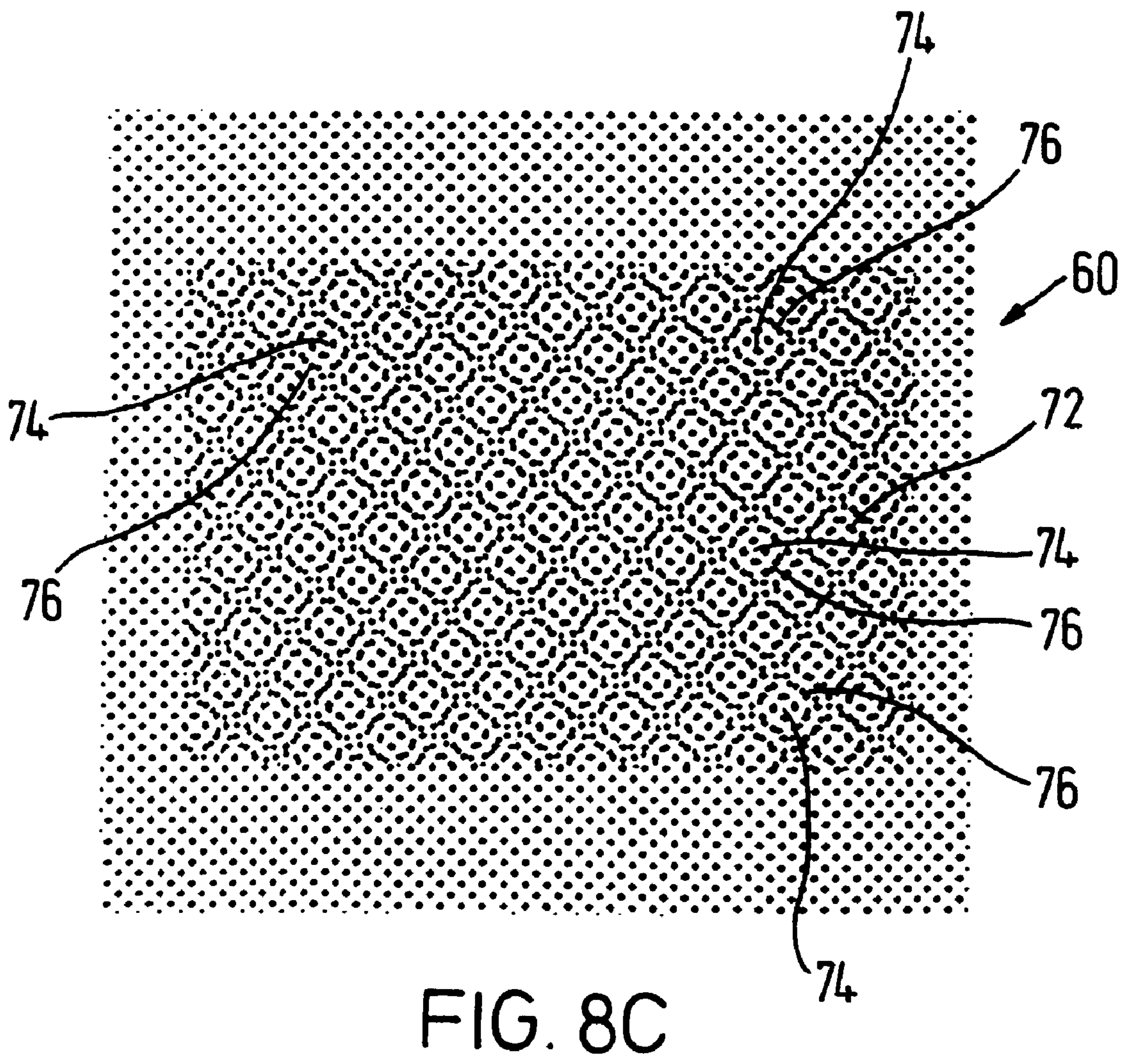
FIG. 8C is a plan view of the resulting interference pattern of the second embodiment created by laminating the point bonded fabric of FIG. 8A using the point lamination pattern of the calender roll of FIG. 8B.

Referring now to FIGS. 8A, 8B and 8C, a second embodiment of the present embodiment is now described. In this second embodiment, the lamination pattern 56 on the calender roll 50 and the bonding pattern 41 on the embossed material 40 have matching bond/contact areas but different pattern axes X, Y, x, y. This embodiment is useful in demonstrating how to implement the present invention when it is desired to utilize two patterns 41, 56 which are nominally the same. In this case, these patterns 41, 56 can be sufficiently differentiated by simply turning the orthogonal axes X, Y, x, y of one of the patterns 41, 56 so that the bonding points 42 are not substantially coincident with the lamination points 55. As varying the lamination pattern 56 on the calender roll 50 would be an expensive implementation, it is more practical to vary the bonding pattern 41 on the embossed material 40 with knowledge of the lamination pattern 56 in order to achieve the required differences. This is because the material can be supplied with a specified emboss pattern by a spunbond material manufacturer, and also the cost of providing the required difference between the patterns can be substantially borne by the spunbond material manufacturer.

FIG. 8A shows the bonding pattern 41 on the embossed material 40 which is a spunbonded polypropylene fabric having 19% bond area. The weight of the fabric is 70 g/m$^2$. The bonding pattern 41 comprises an array of square-shaped bond points 42 having a pitch of approximately 1.75 mm. The array of bond points 42 have orthogonal axes X, Y which are off-set by 30° and 60° respectively to the rotational axis R of the calender roll 50.

The lamination pattern 56 on the calender roll 50 is illustrated in FIG. 8B and is the same as that for the calender roll 50 described in the first embodiment. The important characteristics to note are that the lamination pattern 56 has a 19% contact area and orthogonal axes x, y which are each offset by 45° to the rotational axis R of the calender roll 50.

FIG. 8C illustrates an interference pattern 72 obtained in the resultant laminate 60 when the above described fabric 40 is laminated with a relatively thin, lightweight (25 g/m$^2$) polypropylene film 43. As will be appreciated from consideration of FIG. 8C, there are no large areas of bonding points 42 and lamination points 55 in register. Rather, in the resultant interference pattern 72 there are small groups 74 of approximately four adjacent point locations at which the lamination points 55 and the bonding points 42 are in register. Surrounding each of these groups 74 of four in-register point locations is a group 76 of out-of-register locations at which the lamination points 55 and the bonding points 42 are out of register. The number of adjacent in-register locations is sufficiently small to avoid the formation of unlaminated blisters.

Referring to FIGS. 9A, 9B, 9C, 10, 11 and 12, a third embodiment of the present invention is now described. One way in which this embodiment differs from the previous embodiments is that three materials are laminated together to form a desired three-ply laminate 60. The third material 80 is supplied in a similar manner in which the above described non-embossed material 43 is supplied, namely from a corresponding core with an appropriate number of unwinding and spreading rollers (not shown). This third material 80 (FIG. 12) comprises an embossed lightweight (17 g/m$^2$) spunbond fabric.

Figure 9A:
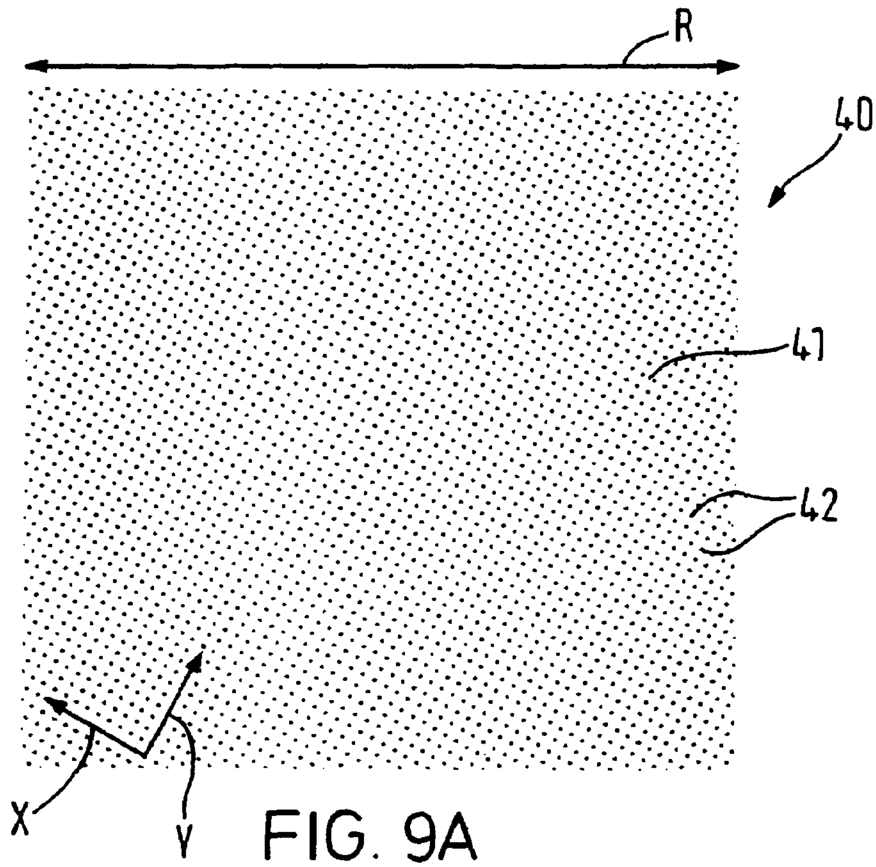
FIG. 9A is a plan view of a 9% round 60°/30° emboss pattern of a point bonded fabric used in a third embodiment of the present invention.
Figure 9B:
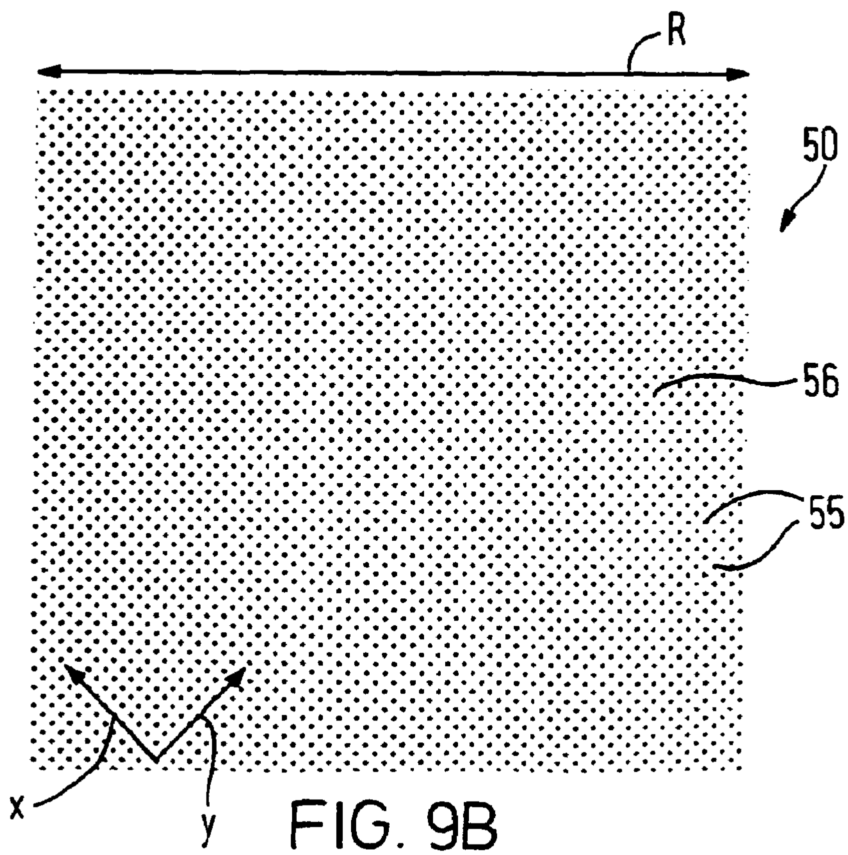
FIG. 9B is a plan view of a 19% square 45°/45° lamination pattern of a point lamination calender roll used in the third embodiment of the present invention.

In this embodiment, the lamination pattern 56 on the calender roll 50 and the bonding pattern 41 on the embossed material 40 are dissimilar in both percentage bond/contact area and orientation and hence do not have groups of plural lamination/bonding points 42, 55 in register. More particularly, a standard lamination pattern 56 on the calender roll 50 as described in the first and second embodiments is used, namely a lamination pattern 56 with a 19% contact area and orthogonal axes x, y which are each off-set by 45° from the rotational axis R of the calender roll 50 as shown in FIG. 9B. The embossed material 40 is a spunbonded polypropylene fabric with an approximate 9% bond area and an array of circular-shaped bond points 42 having a pitch of approximately 1.75 mm. This fabric 40 has a weight of 70 g/m$^2$ with the array of bonding points 42 having orthogonal axes X, Y which are off-set by 30° and 60° respectively to the rotational axis R of the calender roll 50 as shown in FIG. 9A. The non-embossed material 43 (lightweight film) used in this embodiment is the same as that described in the first and second embodiments.

The overall visual appearance of the laminate 60 is not significantly affected by the bond points 42 of the embossed material 40 being circular or square-shaped. The dominant factor governing the appearance of the laminate 60 is the resultant interference pattern formed by the lamination of two different patterns which, in turn, depends on other pattern variables, i.e. differences in pitch between points 42, 55 of the patterns 41, 56 and the relative angles between the axes of the patterns 41, 56. However, the use of different emboss point shapes makes it easier to differentiate between the two patterns 41, 56 for the purposes of description.

Figure 9C:
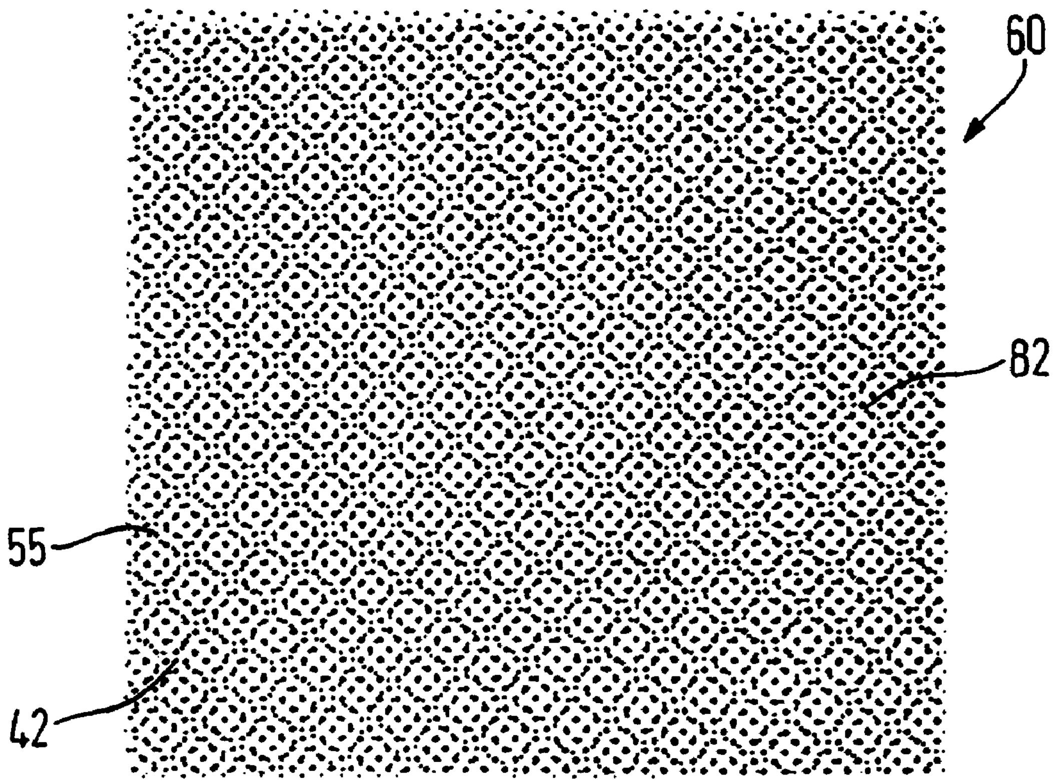
FIG. 9C is a plan view of the resulting interference pattern of the third embodiment created by laminating the point bonded fabric of FIG. 9A using the point lamination pattern of the calender roll of FIG. 9B.
Figure 10:
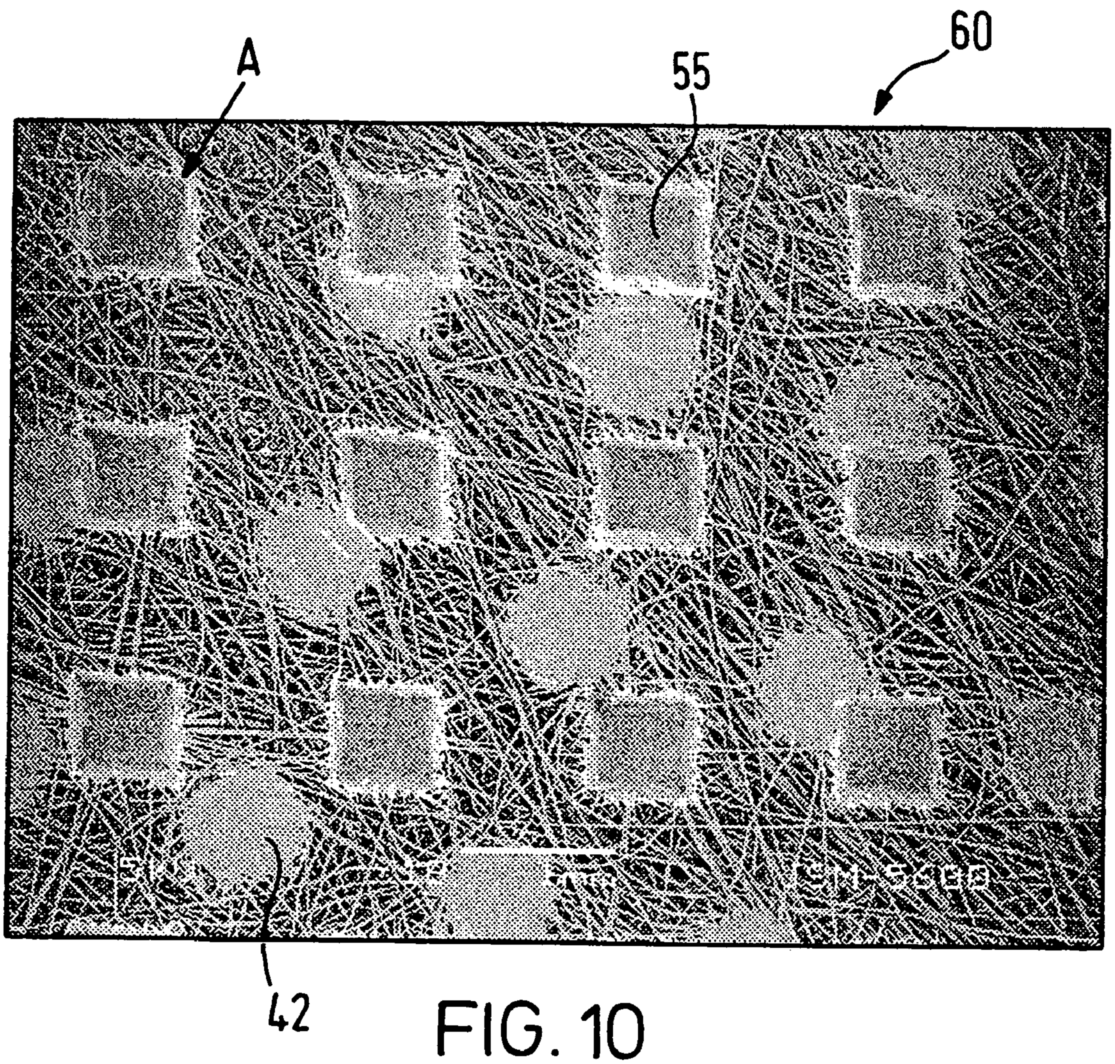
FIG. 10 is a plan view photomicrograph of the surface of the laminate created by laminating the point bonded fabric of FIG. 9A using the point lamination pattern of the calender roll of FIG. 9B.

FIG. 10 is a photomicrograph of a part of the surface of the laminate 60 formed by the third embodiment and FIG. 9C is a point diagram showing the resulting interference pattern 82. As FIG. 9C and FIG. 10 clearly show, there are no groups of plural adjacent bonding point/lamination point pairs in register. When a bonding point 42 and a lamination point 55 are in register, as illustrated by point location A, the bonding points 42 and lamination points 55 immediately adjacent to the in-register point location A are either not in register or only partially in register.

Figure 11:
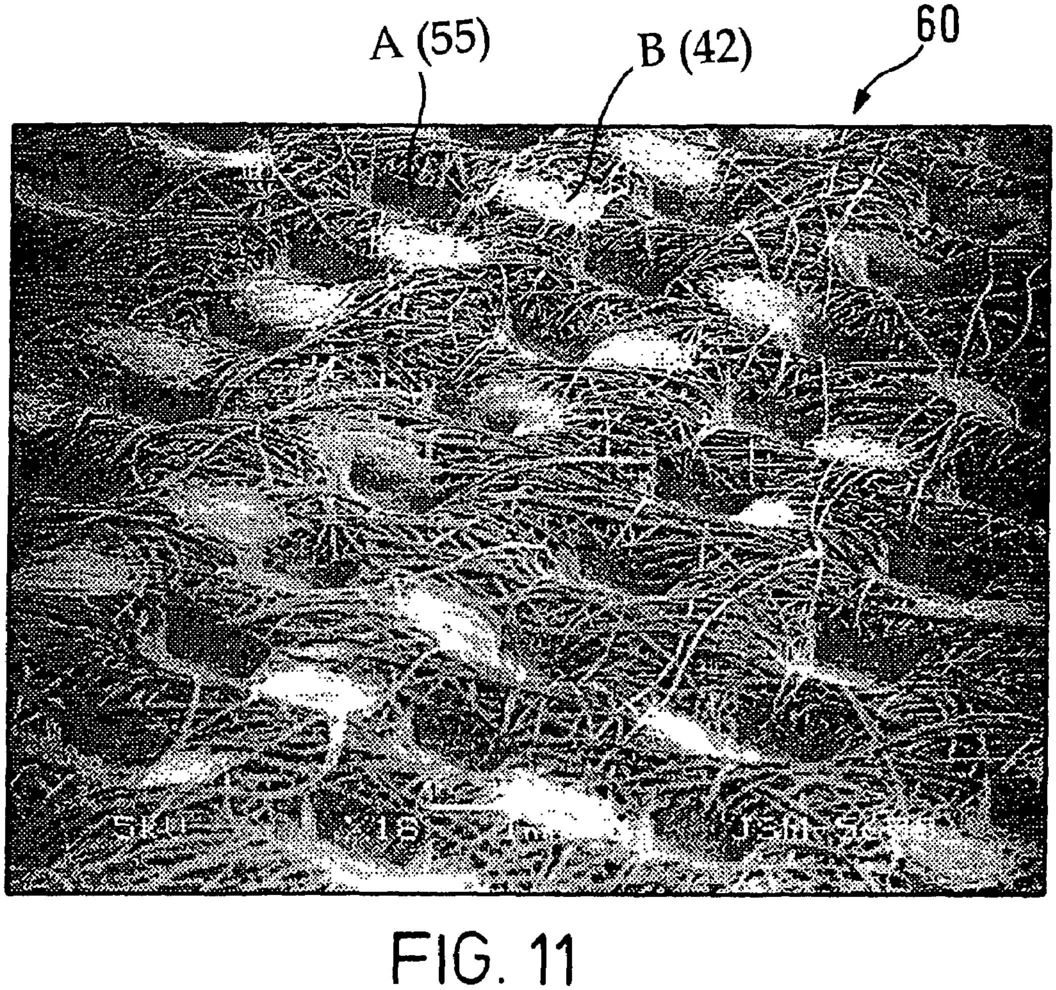
FIG. 11 is an angular view photomicrograph the laminate of FIG. 10.

The effect of the lamination interaction between the two different patterns 41, 56 is further illustrated in FIG. 11 which is a photomicrograph of the surface of the resultant laminate 60 taken at an angle to reveal three-dimensional aspects of the interference pattern 82. The lamination points 55 are visible as square-shaped depressions labelled A while the bonding pattern 41 of the fabric 40 is visible by the reflected light of the circular-shaped bonding points 42 which are labelled A on the surface of the fabric 40.

Figure 12:
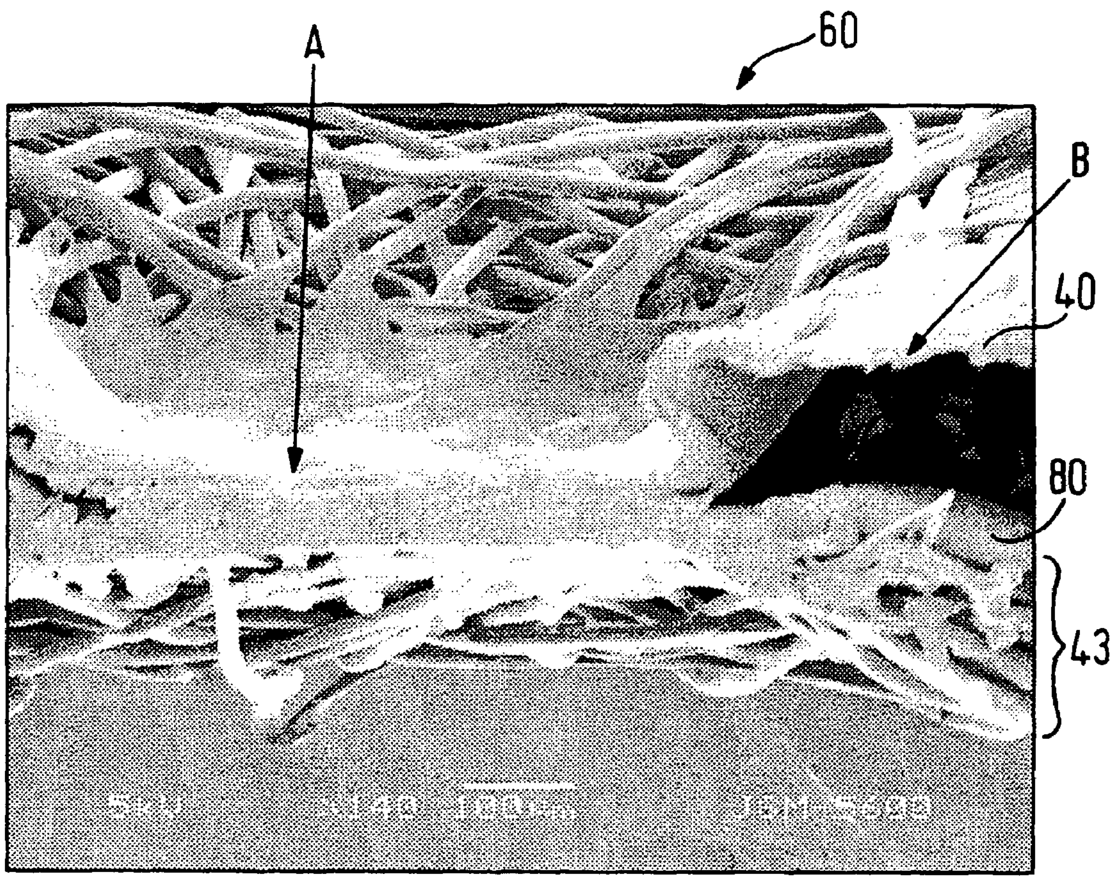
FIG. 12 is a cross-sectional view photomicrograph of the surface of the laminate of FIG. 10 showing a lamination point that is partially in register with an emboss point of the fabric layer.

FIG. 12 is a photomicrograph of a cross-section of a lamination point 55 that is partially in register with a bonding point 42 on the fabric 40. The fabric 40 can be seen to be bonded to the film layer 43 and the third material 80 at the area indicated by A where portions of the lamination point 55 and the bonding point 42 are not in-register. However, in the area of the fabric 40, indicated by B, the fabric 40 is not laminated to the film layer 43 or the third layer 80 and is separated from it because the other portion of the bonding point 42 is in registration with a corresponding portion of the lamination point 55.

A fourth embodiment of the present invention is now described with reference to FIGS. 13A, 13B, 14, 15A, 15B, 16A and 16B. In this embodiment, the orientation of a given embossed material 40 is reversed prior to presentation to the calender roll 50 to produce significantly different results in the laminate 60. In order to better understand the principles involved with this aspect of the present invention, a short description of a comparative case is first described.

Figure 5:
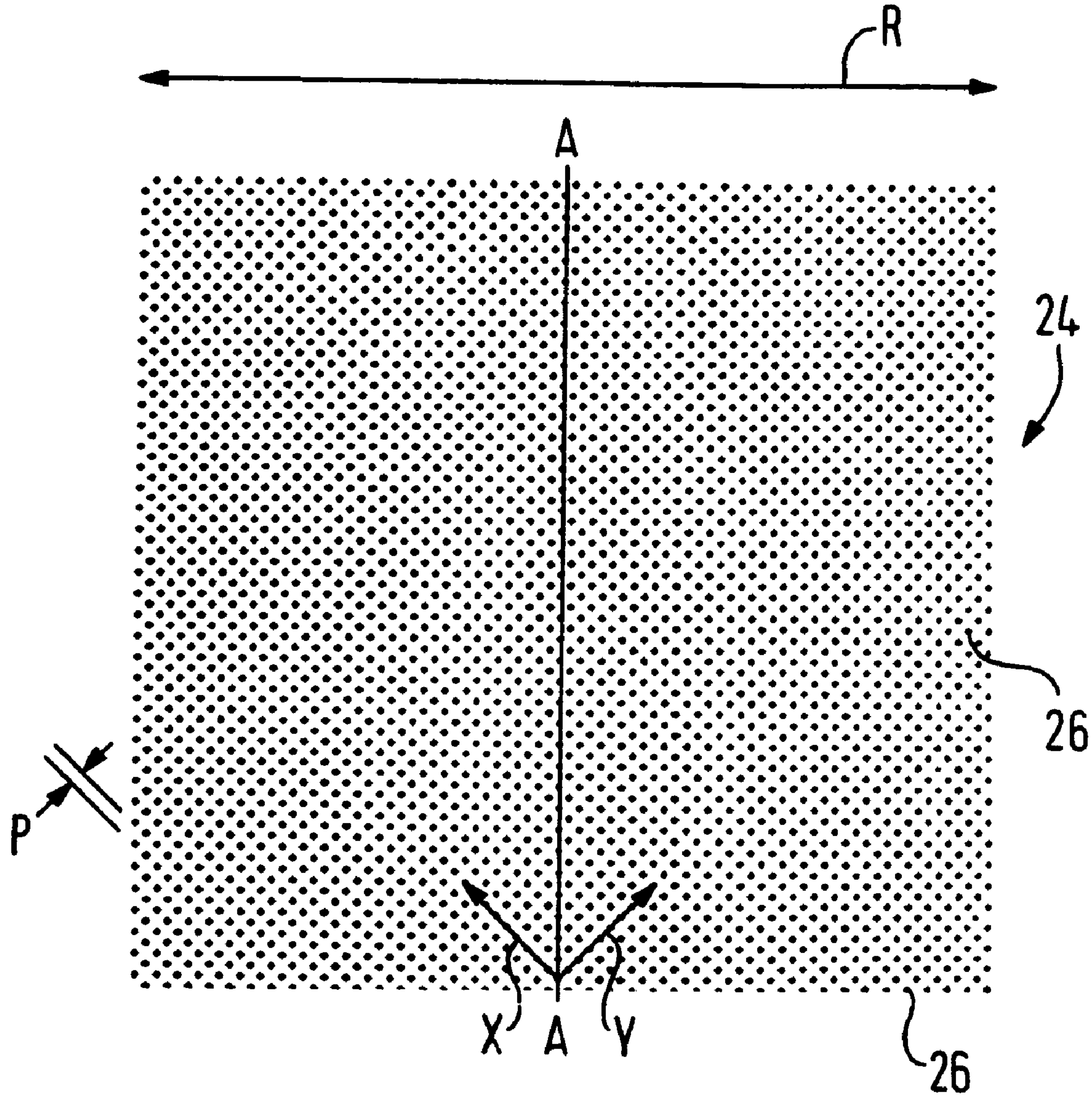
FIG. 5 is a plan view of a 19% square 45°/45° standard emboss pattern of a point bonded fabric used in a prior art lamination process.
Figure 5A:
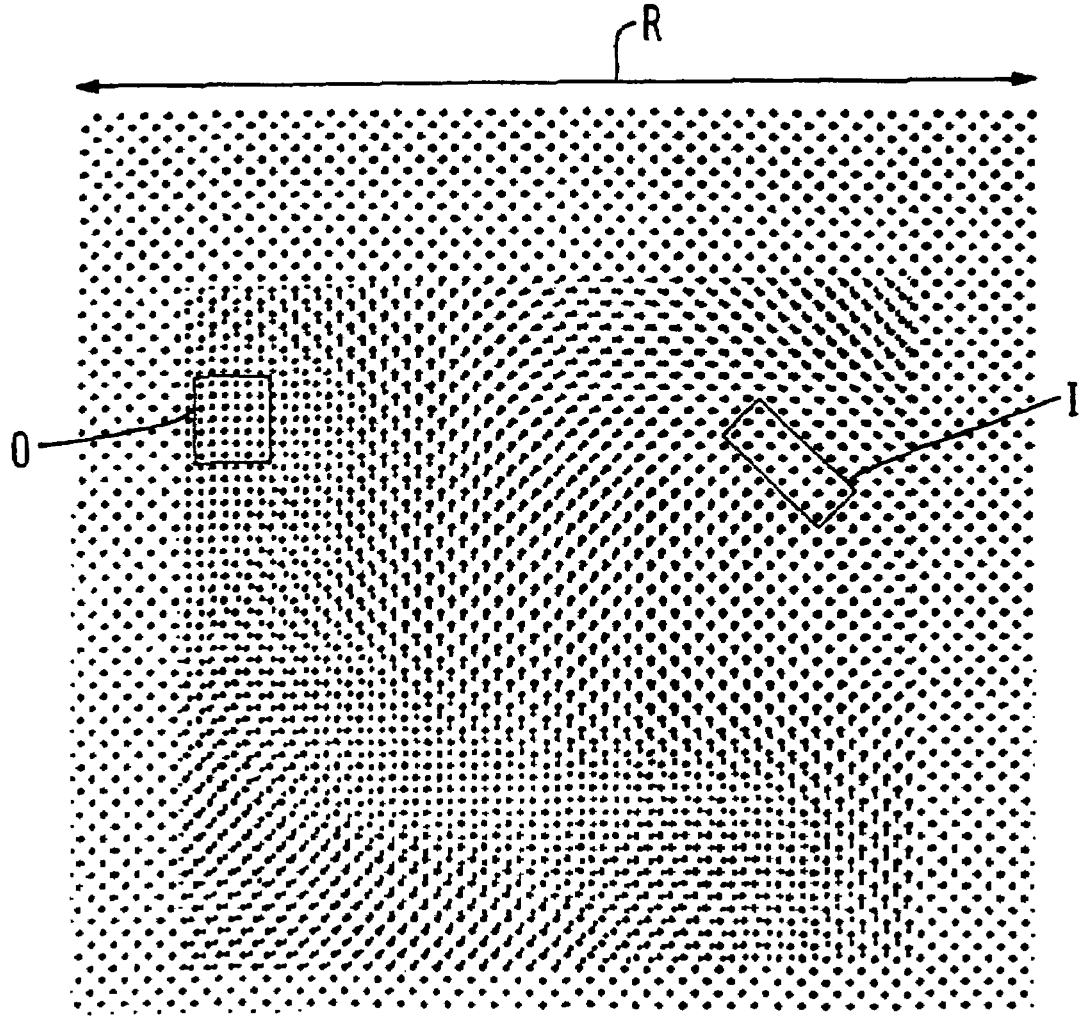
FIG. 5A is a plan view of the resulting interference pattern obtained by laminating the point bonded fabric and a calender roll having similar patterns as shown in FIG. 5 in a prior art lamination process.

Conventionally, the orientation of the embossed pattern has not been an issue in the lamination process. This is because the most commonly used emboss pattern 41 and lamination pattern 56 have involved utilising a 45°/45° square-bonded pattern, namely a pattern with its orthogonal axes X, Y each at 45° to the rotational axis R of the calender roll 50. In such cases, the interference pattern between the lamination pattern 56 of the calender roll 50 and the bonding pattern of the embossed material 40 will be similar irrespective of which surface of the fabric is presented to the calender roll 50 of the laminator. This is clearly shown in FIGS. 13A and 13B where it can be seen that for either orientation of the embossed material 40, sufficient support for forming a secure weld to the non-embossed material 43 at a lamination point 55, will only be available at the parts 84 of the embossed material 40 where it is free of a bonding point 42. The positions of these parts 84 of the embossed material 40 do not change on orientation reversal. This is because the 45°/45° square bonding pattern 41 has a line of symmetry along the centre of the pattern as indicated by the line A—A on FIG. 5, namely along a line orthogonal to the axis of rotation R of the calender roll 50. A round bonding pattern 41 aligned along 45°/45° angles would also have a similar line of symmetry and therefore show the same effect on turning the material over.

Figure 14:
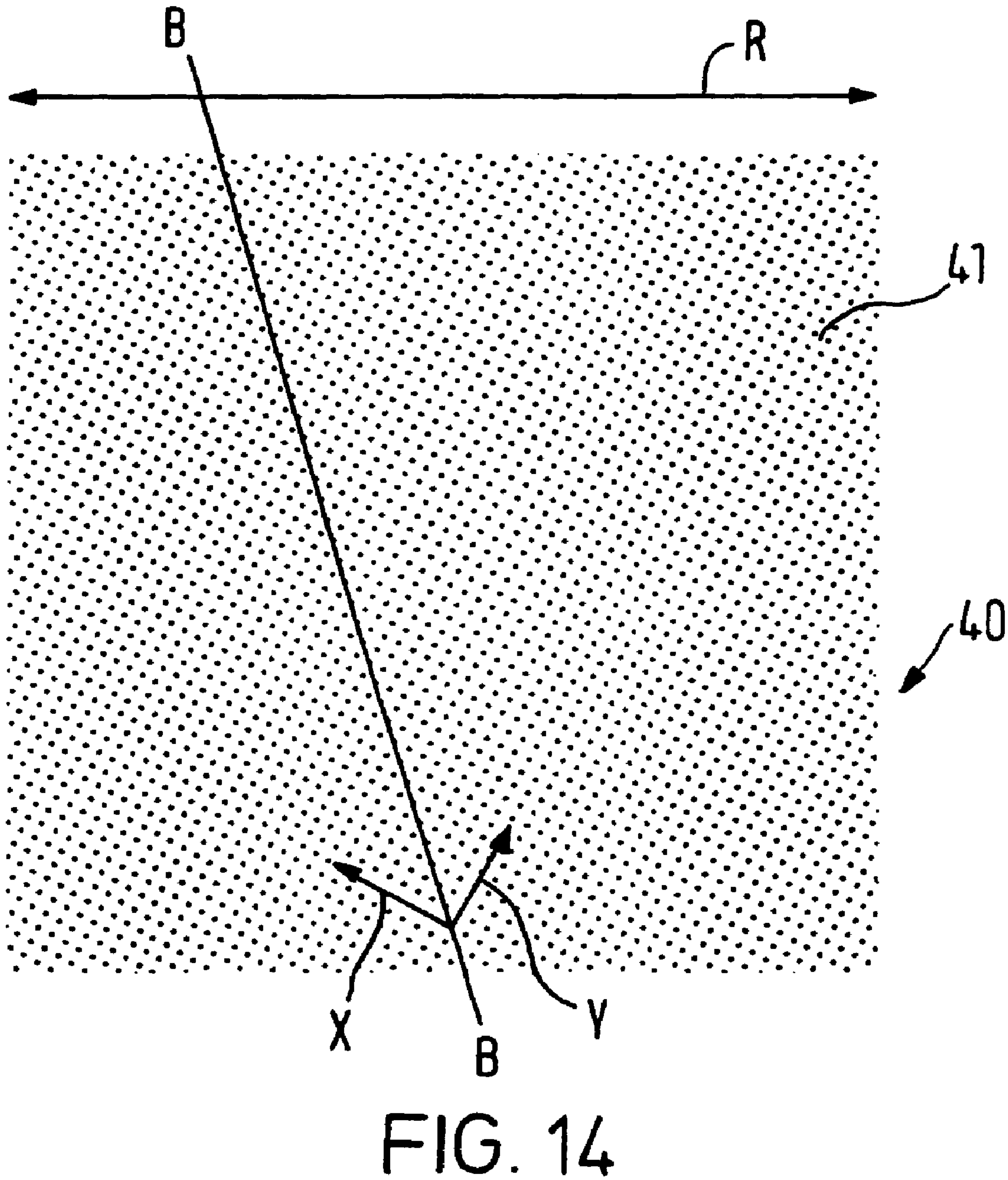
FIG. 14 is a plan view of a 9% round 60°/30° emboss pattern of a point bonded fabric showing its line of symmetry in relation to the axis of rotation of a thermobonding calender roll.

If the bonding pattern 41 has does not have a line of symmetry which is orthogonal to the axis of rotation R of the calender roll 50, for example, if the bonding pattern 41 on the embossed material 40 has X and Y axes aligned at angles other than 45° to the rotational axis R, then the interference pattern between the bonding points 42 of the fabric 40 and the lamination points 55 will be different depending on which surface of the fabric 40 is present to the calender roll 50 during lamination. An example of a pattern (a 60°/30° bonding pattern 41) not having such an orthogonal line of symmetry is shown in FIG. 14, where the line of symmetry of the pattern is marked by the line B—B.

In the present embodiment, the results of both reversing and not reversing the embossed material 40 are now presented. FIGS. 15A and 15B respectively show a 19% pattern 56 of square-shaped lamination points 55 which has orthogonal axes x, y that are each off-set by 45° from the rotational axis R of the calender roll 50 and a 9% bonding pattern 41 of circular-shaped bonding points 42 which has orthogonal axes X, Y that are off-set by 30° and 60° respectively to the rotational axis R of the calender roll 50. The pitch P between the lamination points 55 and the bonding points 42 is 1.75 mm for both patterns 41, 56. In addition, the embossed material 40 comprises a 70 $g/m^2$ spunbonded polypropylene fabric and the non-embossed material 43 comprises a 25 $g/m^2$ polypropylene film.

FIG. 16A illustrates the interference pattern 88 resulting from overlaying the 19% lamination pattern 56 and the 9% bonding pattern 41. The effect of turning the embossed material 40 over is illustrated in FIG. 16B. The 60°/30° angle of the bonding pattern 41 generates a different interference pattern 90 on turning the embossed material 40 over. While the interference patterns 88, 90 can be demonstrated by overlaying the relevant pattern representations, as illustrated in FIGS. 16A and 16B, the actual three-dimensional visual appearance of the resultant laminate 60 cannot be appreciated by these means.

Figure 13A:
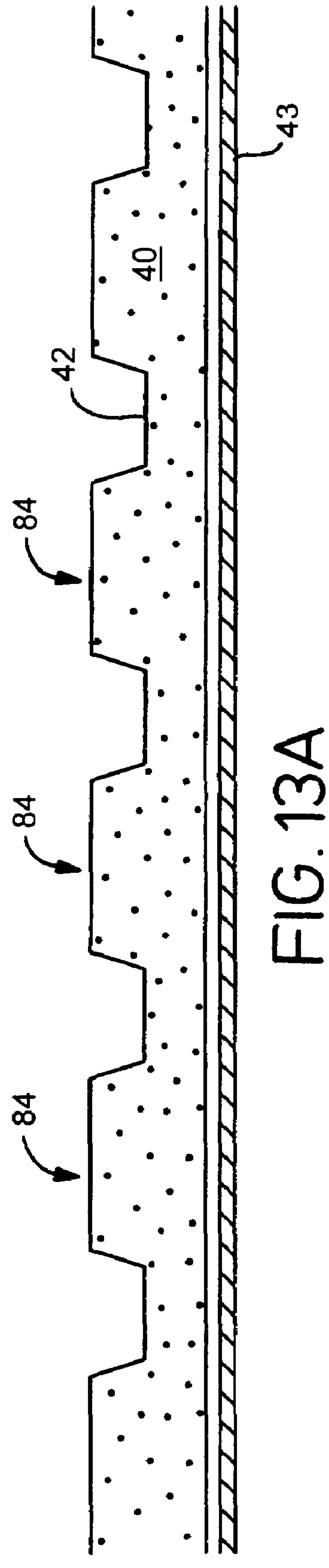
FIGS. 13A and 13B are schematic cross-sectional views of a conventional embossed material in different lamination orientations.
Figure 13B:
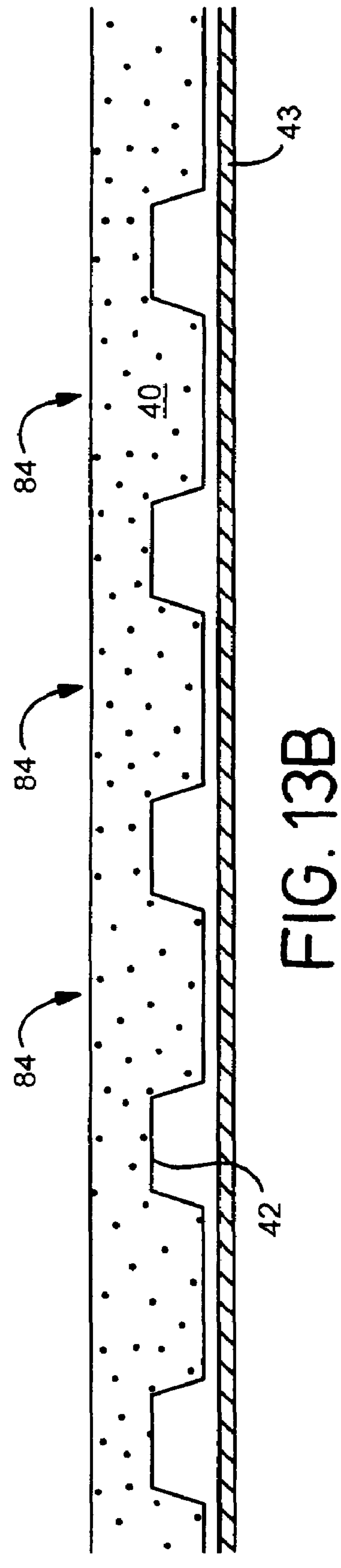

Two additional effects influence the visual appearance of the resultant laminate 60: the three dimensional effect of the lamination pattern 56 and the pattern of reflected light from the bonding points 42 on the fabric 40 that are not in register with the lamination points 55. This latter effect is particularly prominent when the smooth side of the embossed material 40 is presented to the calender roll 50, i.e. if the embossed material 40 of FIG. 3 were turned over, as illustrated in FIG. 13B.

In the interference pattern 90 illustrated in FIG. 16B there are larger groups of adjacent point locations at which the lamination points 55 and the bonding points 42 are substantially in register (I) (approximately twelve) than in the interference pattern 88 shown in FIG. 16A (approximately four). In both these laminates 60, the numbers of adjacent in-register points (I) in each group is sufficiently low to avoid the formation of unlaminated blisters. However, a further unexpected phenomenon has been observed which is described below.

When processing the 70 $g/m^2$ spunbonded polypropylene fabric 40 and the 25 $g/m^2$ polypropylene film 43 arranged in the configuration illustrated in FIG. 16A, a good quality laminate 60 was produced. For many applications a good quality laminate 60 is one in which the components are welded together and there is no damage to the film layer 43 so that it is still able to form a barrier to water of other liquids. The laminate 60 made as illustrated in FIG. 16A had a hydrostatic head >200 cm when tested by ISO 811 (a liquid pressure impermeablity test).

Under the same processing conditions, the unlaminated 70 $g/m^2$ fabric 40 was turned over and the lamination process carried out so that the resultant laminate 60 was configured as illustrated in FIG. 16B. On testing the resulting laminate 60 it was found that the water barrier properties were considerably worse and leakage occurred at hydrostatic head values as low as 60 cm water when tested by the same ISO 811 method. This was a surprising observation and was verified by repeated experiments to confirm that the phenomenon was not a random effect.

Figure 1:
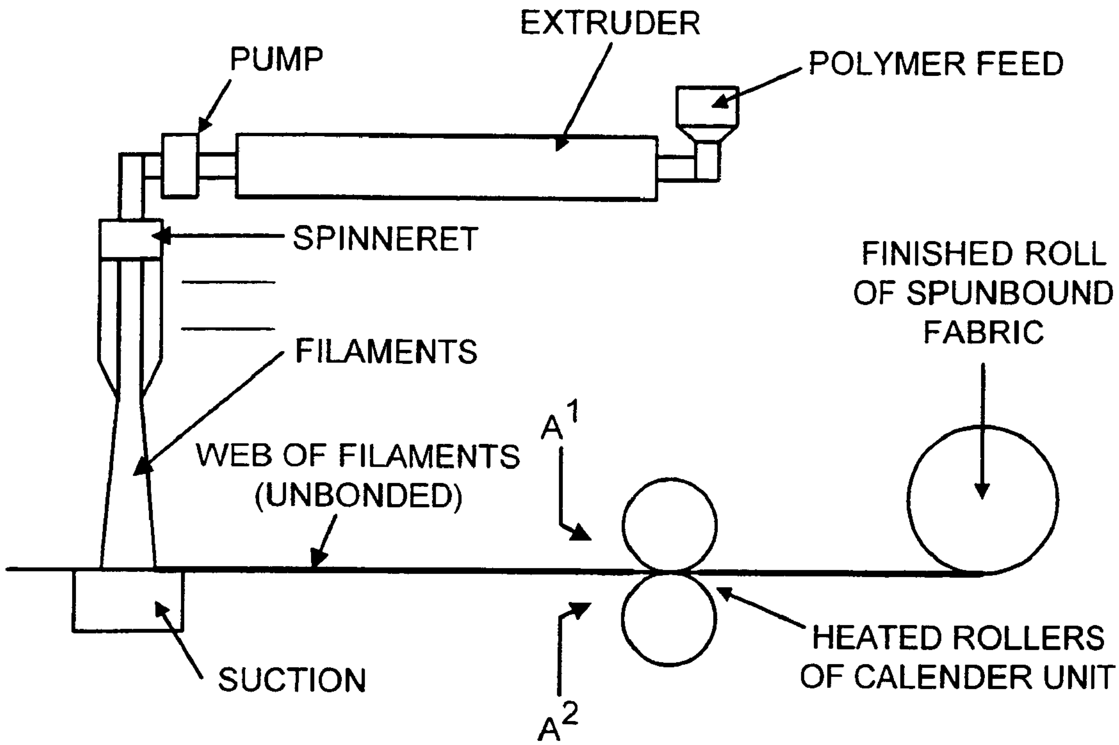
FIG. 1 is a schematic diagram showing the process involved in the manufacture of a spunbonded fabric.
Figure 2:
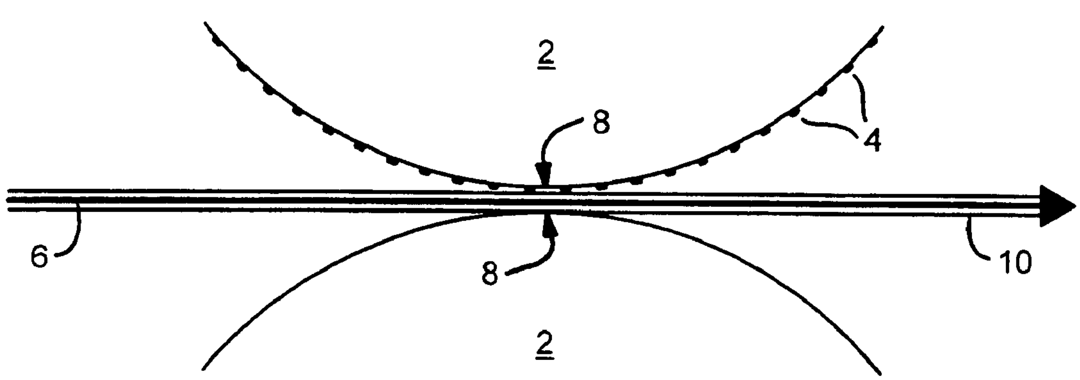
FIG. 2 is a schematic enlarged sectional view of calender system used in the process of point bonding a loose web of fibres.
Figure 3:
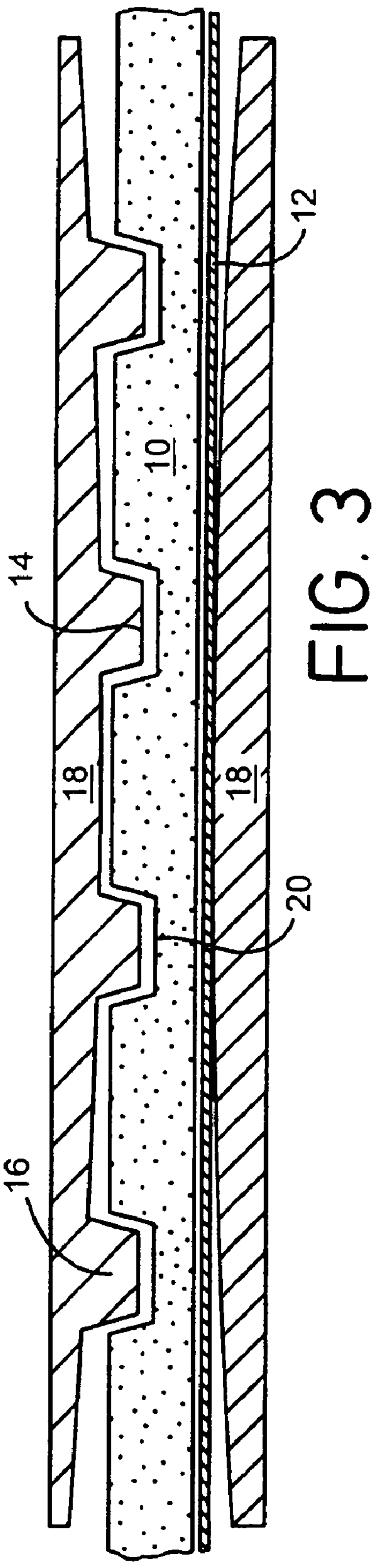
FIG. 3 is a schematic enlarged sectional view of a thermobonding calender apparatus showing a lamination pattern defined by bosses of a calender roll in registration with the embossed points of a point bonded fabric.
Figure 4:
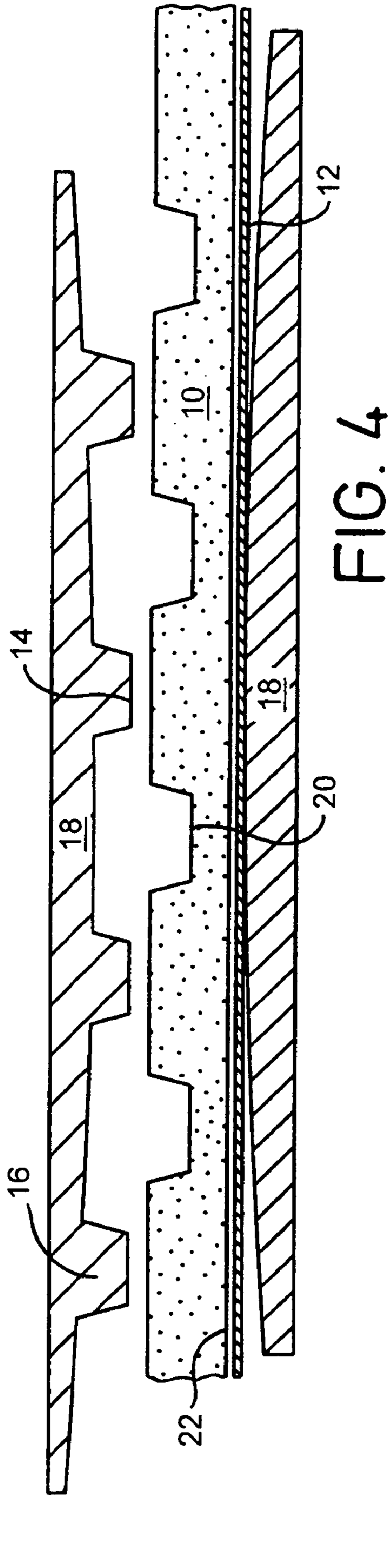
FIG. 4 is a schematic enlarged sectional view of calender apparatus showing a lamination pattern defined by bosses of a calender roll out of registration with the embossed points of a point bonded fabric.

In the configuration illustrated in FIG. 16A, the 70 $g/m^2$ embossed material 40 presented its embossed pattern 41 to the calender roll 50 as illustrated diagrammatically in FIGS. 3 and 4. Since it is this configuration which gave good barrier properties, the phenomenon cannot be attributed to any effect such as lack of cushioning where the lamination points 55 of the calender roll 50 enter the “well” of the emboss points 42 of the embossed material 40. The explanation of this phenomenon is believed to lie in the pressure distribution of the lamination points 55 during the lamination process.

Poor lamination which is generally observed in areas where the emboss points 42 are in register, which results, in the worst cases, in blisters of unlaminated material, are evidence that the pressure exerted by the in-register lamination points 55 is lower than those that are out of register with the bonding points 42 of the fabric 40, as has been explained previously. It follows that the pressure of the calender roll 50 is exerted through the remaining lamination points 55 that are out of register. The more lamination points 55 that are in register, the fewer the lamination points 55 through which the pressure of the calender roll 50 can be exerted and the higher the pressure per lamination point. Accordingly, for the configuration of FIG. 16B, the 25 $g/m^2$ film 43 is being damaged by too high an effective pressure from the calender roll 50 even though the process pressure as indicated by hydraulic valves of the calender roll 50 is unchanged.

Whilst the first second and fourth embodiments describe the lamination of two layers, it is also possible to adapt these embodiments to laminate at least one extra layer. For each additional layer required, this could be carried out by simply adding an extra embossed material roll on an additional feeder core with the appropriate number of flattening and spreading rollers, in the first section 30 of the lamination apparatus 28. For example, a polypropylene film could be laminated in between two spunbonded polypropylene materials. By way of example, FIG. 17 shows a photomicrograph of a three-component laminate in cross-section, made by off-line thermal lamination. Surface A is a 70 g/m$^2$ spunbonded polypropylene fabric, surface B is a 17 g/m$^2$ spunbonded polypropylene fabric and the central layer C is a 25 g/m$^2$ polypropylene film sandwiched between the two outer layers A, B.

The cross-section has been cut across the lamination points D (55) so that the lamination points D (55) are visible and show the three components A, B, C bonded together by a combination of heat and pressure. The array of bonding points of the 70 g/m$^2$ fabric is not shown in this figure. In between the lamination points D (55) at E, the filaments of the spunbonded fabric are visible and it may be seen that, in these areas, they are not bonded to the central film layer C.

A fifth embodiment of the present invention is now described. In this embodiment dissimilar materials can be laminated together using the calender roll 50 point laminating apparatus described above in conjunction with a thermoplastic adhesive layer. An adhesive in the form of an acrylic adhesive, a hot melt adhesive, netting or powder can be used. The adhesive is applied to one of the materials 40, 43 by means of a transfer roll (not shown). The coated material is then passed through the thermobonding calender rolls 50, 52 with the other one of the materials, which melt the adhesive as it passes therethrough. As the materials leave the calender rolls 50, 52 the laminate is cooled and the melted adhesive sets, bonding the materials 40, 43 together.

In this process, adhesive bonding occurs predominantly at the lamination points 55 of the calender roll 50 and not in the intermediate areas which makes it possible to bond a very wide range of products. The following two examples illustrate this adhesive point bonding process. In the first example, a moisture vapour permeable film is bonded to a fabric layer, in order to retain the flexibility and moisture vapour permeability characteristics of the component layers. In a second example, a polypropylene spunbond material is bonded to a polypropylene meltblown material. Using a standard testing procedure and also using the same adhesive, it was seen that, the polypropylene spunbond material achieves a better bond through this process than through a traditional adhesive laminator.

Looking closely at how the second example was achieved it was noticed that, during the calendering part of the process, the polymers had melted to form a layer of thin sheets at the lamination points 55. Whilst these did not fuse, they nonetheless provided a surface onto which the adhesive could form a positive bond. For example, the short fibre meltblown material had formed itself into a film at the lamination points 55, onto and into which the adhesive could form a positive bond. More importantly, however, it is considered that the adhesive melts into the different polymers thereby increasing the bond strength between the different layers over and above traditional adhesive bonding methods.

In a further example of this embodiment, a small amount of thermoplastic adhesive is used to laminate two similar chemical composition materials together, namely two polypropylene materials. The adhesive enhances the point lamination of the two materials. This is due to the combination of thermal bonding of two materials which have similar melting points and composition, supplemented by the thermoplastic adhesive bonding activated at the lamination points 55.

The above examples, in which a thermoplastic adhesive is used, involve point laminating the materials together whilst controlling the interaction between the embossed and lamination patterns. However, the principle of passing adhesive coated materials through a thermobonding calender roll 50 to cause the adhesive and polymer to melt together to form an integrated bond can also be applied to other lamination processes which do not differentiate between the lamination and the emboss patterns or which, for example, point laminate non-embossed materials together.

Although not shown in the above embodiments, the boss size (or the size of each bonding point of the emboss pattern 41), could be varied, typically in conjunction with the bond area or pitch, to produce the required differentiation between the lamination and embossed patterns. It is also to be appreciated that the size of the boss will also likely change if there is a change in the shape of the boss and so, the shape of the boss could also be varied to provide the required pattern differentiation.

In the above described embodiments, the lamination pattern 56 on the calender roll 50 has not been changed. This is because of the comparatively high cost of replacing the calender roll 50 in order to differentiate between the embossed pattern and the lamination pattern 56, as compared to the option of specifying a different emboss pattern 41 on a material to be supplied by a spunbond material manufacturer. However, despite the significant cost differences between these two approaches, it is to be appreciated that the present invention is intended to cover the situation where the lamination pattern 56 on the calender roll 50 is selected and supplied to provide a desired difference between the embossing pattern and the lamination pattern 56.

Having described particular preferred embodiments of the present invention, it is to be appreciated that the embodiments in question are exemplary only and that variations and modifications such as will occur to those possessed of the appropriate knowledge and skills may be made without departure from the spirit and scope of the invention as set forth in the appended claims.

What is claimed is:

1. A method of laminating a first material having an emboss pattern formed thereon to a second material using a point-lamination pattern, said method including, providing a first material comprising a nonwoven spunbonded polymer fabric having a minimum weight of approximately 50 g/m$^2$ and having a plurality of emboss points that are formed under heat and pressure and that form an emboss pattern having raised or depressed formations in the surface of the fabric, providing a second material comprising a non-embossed polymer material, the minimum weight of approximately 50 g/m$^2$ of said nonwoven spunbonded polymer fabric and the emboss pattern having said raised or depressed formations in the surface of the fabric normally causing the occurrence of unlaminated patches in the form of blisters in areas of the resultant laminate where the emboss points of the emboss pattern and lamination points of the lamination pattern were in register with each other during lamination, flattening and tensioning the first and second materials to reduce the tendency of the first and second materials to crease prior to feeding the first and second materials to a single lamination pattern calender roll of which the lamination pattern has a plurality of lamination points, operating the single lamination pattern roll at a substantially constant speed of rotation, feeding the flattened and tensioned first and second materials to the single lamination pattern calender roll rotating at a substantially constant speed bringing the first and second materials together at said single lamination pattern calender roll, and laminating the nonwoven spunbonded polymer fabric first material with the emboss pattern and the non-embossed polymer second material to one another using the single lamination pattern calender roll, feeding the resultant laminate to a finishing core onto which the resultant laminate is wound;

operating the finishing core at a speed of rotation that matches the speed of rotation of said single lamination pattern calender roll;

making use of or controlling interaction between the emboss pattern on the nonwoven spunbonded polymer fabric and the lamination pattern on the single lamination pattern calender roll by selecting and differentiating one or more characteristics of the two patterns whereby to control, during lamination, the amount of point mis-registration between the emboss pattern on the nonwoven spunbonded polymer fabric and the lamination pattern on the single lamination pattern calender roll, whereby the resultant laminate has a laminated area in which the first and second materials each have substantially the same surface area and a visible interference pattern formed of visible emboss points of the emboss pattern and visible lamination points of the lamination pattern, and the occurrence of visible unlaminated patches in the form of blisters in the resultant laminate is avoided.

2. A method according to claim 1, wherein the selection and degree of differentiation between the one or more characteristics of the two patterns is arranged such that areas where emboss points of the emboss pattern on the nonwoven spunbonded polymer fabric are substantially in register with lamination points of the lamination pattern on the single lamination pattern calender roll are smaller than 25 $mm^2$ to avoid the occurrence of visible unlaminated patches in the form of blisters occurring in the resultant laminate.

3. A method according to claim 1, wherein the selection and degree of differentiation between one or more characteristics of the two patterns is arranged to control the size of the areas in the resultant laminate containing groups of adjacent points in each of the emboss pattern on the nonwoven spunbonded polymer fabric and point lamination pattern on the single lamination pattern calender roll and which are in registration, in order to avoid the visual appearance of unlaminated patches occurring in the resultant laminate.

4. A method according to claim 1, wherein the emboss points of the emboss pattern on the non-woven spunbonded polymer fabric and the lamination points of the lamination pattern on the single lamination pattern calender roll each have a respective pitch therebetween and wherein the one or more selected characteristics of the two patterns include the pitch between the emboss points of the emboss pattern on the non-woven spunbonded polymer fabric or lamination points of the point lamination pattern on the single lamination pattern calender roll.

5. A method according to claim 4, wherein the pitch of the emboss pattern on the non-woven spunbonded polymer fabric is varied with respect to the pitch of the point lamination pattern on the single lamination pattern calender roll prior to lamination.

6. A method according to claim 1, wherein the calender roll has a rotational axis, wherein the emboss points of the emboss pattern of the non-woven spunbonded polymer fabric and the lamination points of the lamination pattern each have respective axes of alignment extending at a respective angle to the rotational axis of the single lamination pattern calender roll and wherein the one or more selected characteristics of the two patterns include the axes of alignment of the emboss points of the emboss pattern and of the lamination points of the lamination pattern of the single lamination pattern calender roll.

7. A method according to claim 6, wherein the axes of alignment of the emboss points of the emboss pattern of the non-woven spunbonded polymer fabric and of the lamination points of the lamination pattern of the single lamination pattern calender roll are orthogonal to each other.

8. A method according to claim 6, wherein the axes of alignment of the emboss points of the emboss pattern of the non-woven spunbonded polymer fabric are varied with respect to the axes of the lamination points of the lamination pattern of the single lamination pattern calender roll prior to lamination.

9. A method according to claim 1, wherein the one or more selected characteristics of the two patterns include one of the percentage bond area of the emboss pattern of the non-woven spunbonded polymer fabric and the percentage contact area of the point lamination pattern of the single lamination pattern calender roll.

10. A method according to claim 9, wherein the percentage bond area of the emboss pattern of the non-woven spunbonded polymer fabric is varied with respect to the percentage contact area of the point lamination pattern of the single lamination pattern calender roll prior to lamination.

11. A method according to claim 1, wherein the one or more selected characteristics of the two patterns include one of the shape of each emboss point of the emboss pattern of the non-woven spunbonded polymer fabric and the shape of each lamination point of the point lamination pattern of the single lamination pattern calender roll.

12. A method according to claim 11, wherein the shape of each emboss point of the emboss pattern of the non-woven spunbonded polymer fabric is varied with respect to the shape of each lamination point of the lamination pattern of the single lamination pattern calender roll prior to lamination.

13. A method according to claim 1, wherein the one or more selected characteristics include one of the size of each emboss point of the emboss pattern of the non-woven spunbonded polymer fabric and of the size of each lamination point of the point lamination pattern of the single lamination pattern calender roll.

14. A method according to claim 13, wherein the size of each emboss point of the emboss pattern of the non-woven spunbonded polymer fabric is varied with respect to the size of each lamination point of the lamination pattern on the single lamination pattern calender roll prior to lamination.

15. A method according to claim 1, further comprising providing a thermoplastic adhesive layer between the non-woven spunbonded polymer fabric and non-embossed polymer material during lamination.

16. A method according to claim 15, wherein the adhesive layer is provided as a coating on one of said nonwoven spunbonded polymer fabric and non-embossed polymer material.

17. A method according to claim 16, wherein the coating is substantially continuous but provides discrete adhesive bonding points between the nonwoven spunbonded polymer fabric and non-embossed polymer material at the lamination points during lamination.

18. A method according to claim 17, wherein the nonwoven spunbonded polymer fabric is a thermoplastic polymer and wherein the single lamination pattern calender roll is a thermobonding calender.

19. A method according to claim 18, including passing the thermoplastic adhesive layer and the nonwoven spunbonded thermoplastic polymer fabric through the thermobonding calender such that they are caused to melt together to form an integrated bond.

20. A method according to claim 19, wherein the non-embossed polymer material is a thermoplastics polymer and is also caused to melt to form part of the integrated bond.

21. A method according to claim 1, wherein the spunbonded polymer fabric comprises a polymer selected from the group consisting of polypropylene, polyethylene, polyester and polyamide.

22. A method according to claim 1, wherein the non-embossed polymer material comprises a thin film.

23. A method according to claim 22, wherein the thin film comprises a polymer selected from the group consisting of polypropylene, polyethylene, polyester and polyamide.

24. A method according to claim 1, further comprising providing a further layer between the non-woven spunbonded polymer fabric and the non-embossed polymer material.

25. A method according to claim 24, wherein the further layer is one of a microfibre layer and a continuous thin film.

26. A method according to claim 1, wherein the single lamination pattern calender roll has a rotational axis, wherein the nonwoven spunbonded polymer fabric has oppositely facing surfaces of which a first oppositely facing surface is presented to the single lamination calender roll and has an emboss pattern which is non-symmetrical about a line transverse to the rotational axis of the single lamination pattern calender roll, and wherein the nonwoven spunbonded polymer fabric is turned over prior to lamination to present to the single lamination calender roll a second alternative oppositely facing surface with an emboss pattern having different pattern characteristics to that presented when the nonwoven spunbonded polymer fabric is not turned over.

27. A method according to claim 26, wherein the turned over embossed pattern of the nonwoven spunbonded polymer fabric is sufficiently different to the non-turned over embossed pattern to provide under the same lamination process conditions a different pressure distribution across the laminate.

28. A method according to claim 27, wherein the difference in pressure distributions leads to perforation of the laminate when the nonwoven spunbonded polymer fabric is turned over and non-perforation when it is not turned over.

29. A method according to claim 1, wherein the axes of alignment of the emboss points of the emboss pattern of the non-woven spunbonded polymer fabric and of the lamination points of the lamination pattern of the single lamination pattern calender roll are orthogonal to each other.

30. A method according to claim 1, wherein the axes of alignment of the emboss points of the emboss pattern of the non-woven spunbonded polymer fabric are varied with respect to the axes of the lamination points of the lamination pattern of the single lamination pattern calender roll prior to lamination.

31. A method according to claim 1, wherein the percentage bond area of the emboss pattern of the non-woven spunbonded polymer fabric is varied with respect to the percentage contact area of the point lamination pattern of the single lamination pattern calender roll prior to lamination.

32. A method according to claim 1, wherein the shape of each emboss point of the emboss pattern of the non-woven spunbonded polymer fabric is varied with respect to the shape of each lamination point of the lamination pattern of the single lamination pattern calender roll prior to lamination.

33. A method according to claim 1, wherein the size of each emboss point of the emboss pattern of the non-woven spunbonded polymer fabric is varied with respect to the size of each lamination point of the lamination pattern on the single lamination pattern calender roll prior to lamination.

34. A method according to claim 1, wherein the nonwoven spunbonded polymer fabric has oppositely facing surfaces of which a first oppositely facing surface is presented to the single lamination calender roll and has an emboss pattern which is non-symmetrical about a line transverse to the rotational axis of the single lamination pattern calender roll, and wherein the nonwoven spunbonded polymer fabric is turned over prior to lamination to present to the single lamination calender roll a second alternative oppositely facing surface with an emboss pattern having different characteristics to that presented when the nonwoven spunbonded polymer fabric is not turned over.

35. A method according to claim 34, wherein the turned over embossed pattern of the nonwoven spunbonded polymer fabric is sufficiently different to the non-turned over embossed pattern to provide under the same lamination process conditions a different pressure distribution across the laminate.

36. A method according to claim 35, wherein the difference in pressure distributions leads to perforation of the laminate when the nonwoven spunbonded polymer fabric is turned over and non-perforation when it is not turned over.

* * * * *

UNITED STATES PATENT AND TRADEMARK OFFICE

CERTIFICATE OF CORRECTION

PATENT NO. : 6,986,825 B1
APPLICATION NO. : 09/762617
DATED : January 17, 2006
INVENTOR(S) : Leslie J. Squires et al.

It is certified that error appears in the above-identified patent and that said Letters Patent is hereby corrected as shown below:

Col. 21, line 7 "speed" should read --speed;--
Col. 24, line 3 - 52
Claims 29 through 36 should be deleted pursuant to Amendment filed September 8, 2005.

Signed and Sealed this

Sixth Day of March, 2007

JON W. DUDAS
*Director of the United States Patent and Trademark Office*